US006185175B1

(12) United States Patent
Zook

(10) Patent No.: US 6,185,175 B1
(45) Date of Patent: Feb. 6, 2001

(54) SAMPLED AMPLITUDE READ CHANNEL EMPLOYING NOISE WHITENING IN A REMOD/DEMOD SEQUENCE DETECTOR

(75) Inventor: Christopher P. Zook, Longmont, CO (US)

(73) Assignee: Cirrus Logic, Inc., Austin, TX (US)

( * ) Notice: Under 35 U.S.C. 154(b), the term of this patent shall be extended for 0 days.

(21) Appl. No.: 09/204,758

(22) Filed: Dec. 2, 1998

(51) Int. Cl.[7] ....................................................... G11B 5/76
(52) U.S. Cl. .................................. 369/59; 360/53
(58) Field of Search ................................. 369/47, 48, 49, 369/54, 59, 124.05; 360/27, 32, 53, 54, 65; 371/30, 40.14, 43.1, 43.4

(56) References Cited

U.S. PATENT DOCUMENTS

| 5,521,945 | 5/1996 | Knudson . |
| 5,559,835 | 9/1996 | Betts . |
| 5,619,539 | 4/1997 | Coker et al. . |
| 5,771,127 | 6/1998 | Reed et al. . |
| 5,774,286 | 6/1998 | Shimoda . |
| 5,774,470 | 6/1998 | Nishiya et al. . |
| 5,784,415 | 7/1998 | Chevillat et al. . |
| 5,809,080 | 9/1998 | Karabed et al. . |
| 5,844,741 | 12/1998 | Yamakawa et al. . |
| 5,889,823 | 3/1999 | Agazzi et al. . |
| 5,938,790 | 8/1999 | Marrow . |
| 5,949,831 | 9/1999 | Coker et al. . |

OTHER PUBLICATIONS

Roger Wood, "Turbo–PRML: A Compromise EPRML Detector," *IEEE Transactions on Magnetics*, vol. 29, No. 6, Nov. 1993.

Hideyuki Yamakawa, "SPERD: Simplified Partial Error Response Detection," *IEEE Inter Mag '95*, San Antonio, Texas, Apr. 1995.

Takushi Nishiya, "PERD: Partial Error Response Detection," *IEEE Inter Mag '95*, San Antonio, Texas, Apr. 1995.

Takushi Nishiya and Hideyuki Yamakawa, "PERD: Partial Error Response Detection," *IEEE Transactions on Magnetics*, vol. 31, No. 6, Nov. 1995.

(List continued on next page.)

*Primary Examiner*—Paul W. Huber
(74) *Attorney, Agent, or Firm*—Howard H. Sheerin; Dan A. Shifrin; J. P. Violette

(57) ABSTRACT

A sampled amplitude read channel is disclosed for disk storage systems (e.g., magnetic or optical) comprising a sampling device for sampling the analog read signal emanating from the read head positioned over a disk storage medium, a channel equalizer for equalizing the signal samples according to a desired partial response, a trellis sequence detector for detecting a preliminary sequence from the equalized signal samples, and a post processor for correcting errors in the preliminary sequence, including errors caused by the channel equalizers correlating the noise in the read signal. The preliminary sequence detected by the sequence detector is remodulated into ideal partial response samples and then subtracted from the actual signal samples to generate a sequence of sample errors. The sample errors are then filtered by a sample error filter, and the filtered sample errors are correlated with error event sequences corresponding to the most likely error events of the trellis sequence detector. The sample error filter compensates for the noise correlating effect of the channel equalizers by effectively whitening the noise to provide a closer approximation to an optimum maximum likelihood detector. When an error event is detected, the preliminary sequence is corrected with a correction sequence corresponding to the detected error event.

21 Claims, 15 Drawing Sheets

OTHER PUBLICATIONS

Bahl et al, "Optimal Decoding of Linear Codes for Minimizing Symbol Error Rate", *IEEE Trans. on Information Theory,* Mar. 1974.

J. Hagenauer and P. Hoeher, "A Viterbi Algorithm with Soft–Decision Outputs and its Applications", Conference Proceedings, IEEE Globecom, Dallas, TX, Nov., 1989.

Peter A. McEwen and Jack K. Wolf, "Trellis Codes for (1,k) E2PR4ML with Squared Distance 18", *IEEE Transactions on Magnetics,* vol. 32, No. 5, Sep. 1996.

R. Yamasaki, et al., "A 1, 7 Code EEPR4 Read Channel IC with an Analog Noise Whitening Detector", *IEEE International Solid–State Circuits Conference,* 1997, Paper SA 19.2.

H. L. V. Trees, Detection, Estimation, and Modulation Theory, John Wiley & Sons, 1968, pp. 290–297.

S. Haykin, *Communication Systems,* John Wiley & Sons, 1978, pp. 254–256.

T. Nishiya et al., "Turbo–EEPRML: An EEPR4 Channel with an Error–Correcting Post–Processor Designed for 16/17 Rate Quasi–MTR Code", *IEEE Globecom,* Nov. 8–12, 1998.

H. Sawaguchi et al., "Concatenated Error Correction Coding for High–Order PRML Channels", *IEEE Globecom,* Nov. 8–12, 1998.

Co–pending U.S. Patent Application Ser. No. 08/862,493 filed on May 23, 1997.

Co–pending U.S. Patent Application Ser. No. 08/862,492 filed on May 23, 1997.

Co–pending U.S. Patent Application Ser. No. 09/016,004 filed on Jan. 30, 1998.

NRZ

PR 4

EPR 4

EEPR 4

SAMPLED AMPLITUDE READ CHANNEL EMPLOYING NOISE WHITENING IN A REMOD/DEMOD SEQUENCE DETECTOR

CROSS REFERENCE TO RELATED APPLICATIONS AND PATENTS

This application is related to other U.S. patent applications, namely application Ser. No. 08/440,508 entitled "SAMPLED AMPLITUDE READ CHANNEL EMPLOYING A REMOD/DEMOD SEQUENCE DETECTOR GUIDED BY AN ERROR SYNDROME," now U.S. Pat. Nos. 5,696,639 and 09/127,101 entitled "A SAMPLED AMPLITUDE READ CHANNEL EMPLOYING A TRELLIS SEQUENCE DETECTOR MATCHED TO A CHANNEL CODE CONSTRAINT AND A POST PROCESSOR FOR CORRECTING ERRORS IN THE DETECTED BINARY SEQUENCE USING THE SIGNAL SAMPLES AND AN ERROR SYNDROME, pending." This application is also related to U.S. Pat. No. 5,771,127 entitled "A SAMPLED AMPLITUDE READ CHANNEL EMPLOYING INTERPOLATED TIMING RECOVERY AND A REMOD/DEMOD SEQUENCE DETECTOR," U.S. Pat. No. 5,585,975, "EQUALIZATION FOR SAMPLE VALUE ESTIMATION AND SEQUENCE DETECTION IN A SAMPLED AMPLITUDE READ CHANNEL" and U.S. Pat. No. 5,291,499 entitled "METHOD AND APPARATUS FOR REDUCED-COMPLEXITY VITERBI-TYPE SEQUENCE DETECTORS." The above-named patent applications and patents are assigned to the same entity, and are incorporated herein by reference.

FIELD OF INVENTION

The present invention relates to the recording and reproduction of binary data in disk storage systems for digital computers, particularly to a sampled amplitude read channel employing noise whitening in a post processor of a remod/demod sequence detector.

BACKGROUND OF THE INVENTION

In disk drive storage devices for digital computers, such as magnetic and optical disk drives, sampled amplitude read channels employing partial response (PR) signaling with maximum likelihood (ML) sequence detection have provided a substantial increase in storage capacity by enabling significantly higher linear bit densities. Partial response signaling refers to a particular method for transmitting symbols represented as analog pulses through a communication medium. The benefit is that at the signaling instances (baud rate) there is no intersymbol interference (ISI) from other pulses except for a controlled amount from immediately adjacent, overlapping pulses. Allowing the pulses to overlap in a controlled manner leads to an increase in the symbol rate (linear recording density) without sacrificing performance in terms of signal-to-noise ratio (SNR).

Partial response channels are characterized by the polynomials $$(1-D)(1+D)^n$$

where D represents a delay of one symbol period and n is an integer. For n=1,2,3, the partial response channels are referred to as PR4, EPR4 and EEPR4, with their respective frequency responses shown in FIG. 1A. The channel's dipulse response, the response to an isolated symbol, characterizes the transfer function of the system (the output for a given input). With a binary "1" bit modulating a positive dipulse response and a binary "0" bit modulating a negative dipulse response, the output of the channel is a linear combination of time shifted dipulse responses. The dipulse response for a PR4 channel $(1-D^2)$ is shown as a solid line in FIG. 1B. Notice that at the symbol instances (baud rate), the dipulse response is zero except at times t=0 and t=2. Thus, the linear combination of time shifted PR4 dipulse responses will result in zero ISI at the symbol instances except where immediately adjacent pulses overlap.

It should be apparent that the linear combination of time shifted PR4 dipulse responses will result in a channel output of +2, 0, or -2 at the symbol instances depending on the binary input sequence. The output of the channel can therefore be characterized as a state machine driven by the binary input sequence, and conversely, the input sequence can be estimated or demodulated by running the signal samples at the output of the channel through an "inverse" state machine. Because noise will obfuscate the signal samples, the inverse state machine is actually implemented as a trellis sequence detector which computes a most likely input sequence associated with the signal samples (i.e., the sequence through a trellis that is closest to the signal samples in Euclidean space).

The performance of the trellis sequence detector in terms of bit error rate depends on the amount and character of noise in the system, including noise due to the spectrum of the read signal diverging from the ideal partial response. A channel equalizer is typically employed to shape the response of the read channel into the target partial response and to remove linear distortions in the read signal. The channel equalizer may be implemented in continous-time operating on the analog read signal, or it may be implemented in discrete-time operating on samples of the read signal, or both. Typical read channels employ an analog equalizer, such as a biquad analog filter, followed by a nth order finite-impulse response (FIR) discrete-time filter.

A drawback of the channel equalizers is that they tend to correlate the noise in the read signal, thereby degrading the performance of the trellis sequence detector which is a maximum likelihood detector only if the noise is additive white Gausian (AWG). Further, the undesirable noise correlating effect of the channel equalizers increases as the amount of equalization required to match the channel response to the target response increases. Increasing the order of the partial response target generally decreases the amount of equalization required, but it also increases the cost and complexity of the trellis sequence detector due to the increase in the number of states in the trellis state machine. The amount of equalization required also increases as the linear bit density increases, which is inevitable given the perpetual increase in demand for higher capacity disk drives.

There is, therefore, a need for a sampled amplitude read channel for use in disk storage systems that provides a performance enhancing improvement by attenuating the deleterious effect of the channel equalizer filters without increasing the cost and complexity of the trellis sequence detector. In particular, it is an object of the present invention to compensate for the performance degradation caused by the channel equalizers correlating the noise in the read signal.

SUMMARY OF THE INVENTION

A sampled amplitude read channel is disclosed for disk storage systems (e.g., magnetic or optical) comprising a sampling device for sampling the analog read signal emanating from the read head positioned over a disk storage medium, a channel equalizer for equalizing the signal samples according to a desired partial response, a trellis sequence detector for detecting a preliminary sequence from the equalized signal samples, and a post processor for correcting errors in the preliminary sequence, including errors caused by the channel equalizers correlating the noise in the read signal. The preliminary sequence detected by the sequence detector is remodulated into ideal partial response samples and then subtracted from the actual signal samples to generate a sequence of sample errors. The sample errors are then filtered by a sample error filter, and the filtered sample errors are correlated with error event sequences corresponding to the most likely error events of the trellis sequence detector. The sample error filter compensates for the noise correlating effect of the channel equalizers by effectively whitening the noise to provide a closer approximation to an optimum maximum likelihood detector. When an error event is detected, the preliminary sequence is corrected with a correction sequence corresponding to the detected error event.

BRIEF DESCRIPTION OF THE DRAWINGS

The above and other aspects and advantages of the present invention will be better understood by reading the following detailed description of the invention in conjunction with the drawings, wherein.

DETAILED DESCRIPTION OF THE PREFERRED EMBODIMENT

Data Format

Figure 2A:
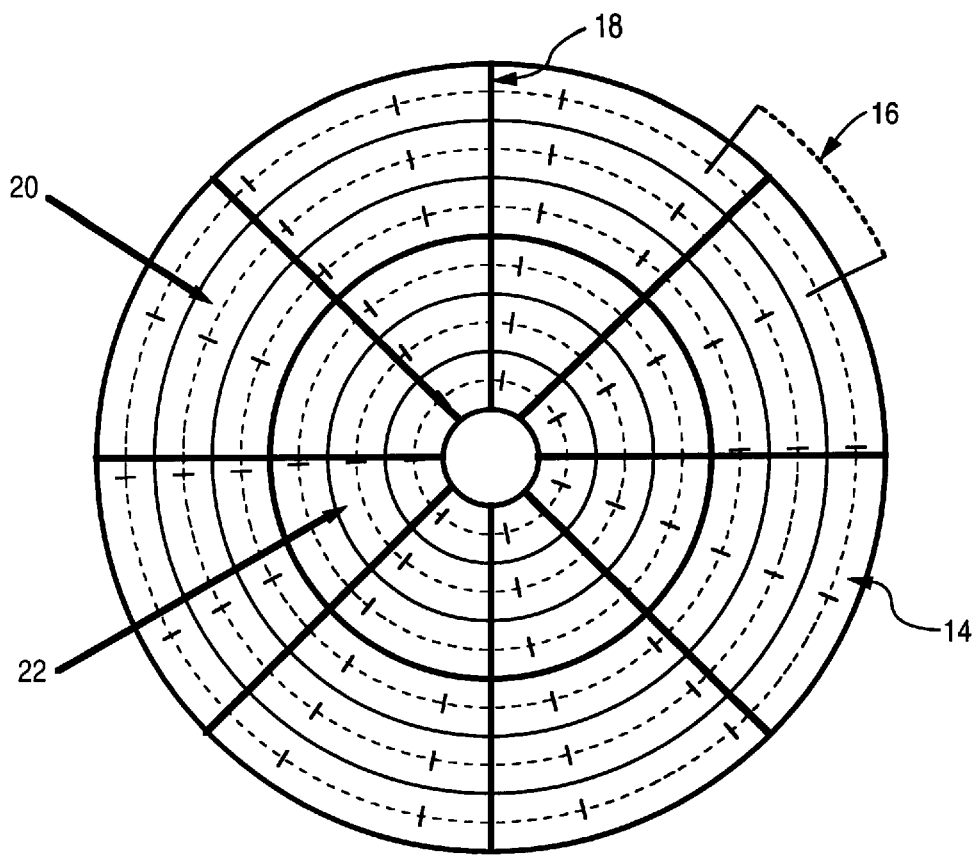
FIG. 2A shows a typical data format for a magnetic disk storage medium, comprising a plurality of concentric data tracks grouped in predefined zones, where each data track is partitioned into a number of data sectors.

FIG. 2A shows a conventional data format of a magnetic disk storage medium comprising a series of concentric, radially spaced data tracks 14, wherein each data track 14 comprises a plurality of sectors 16 with embedded servo wedges 18. A servo controller (not shown) processes the servo data in the servo wedges 18 and, in response, positions a read/write head over a selected track. Additionally, the servo controller processes servo bursts within the servo wedges 18 to keep the head aligned over a centerline of the selected track while writing and reading data. The servo wedges 18 may be detected by a simple discrete-time pulse detector or by a discrete-time sequence detector. The format of the servo wedges 18 includes a preamble and a sync mark, similar to the user data sectors 16 described below with reference to FIG. 2B.

Figure 4A:
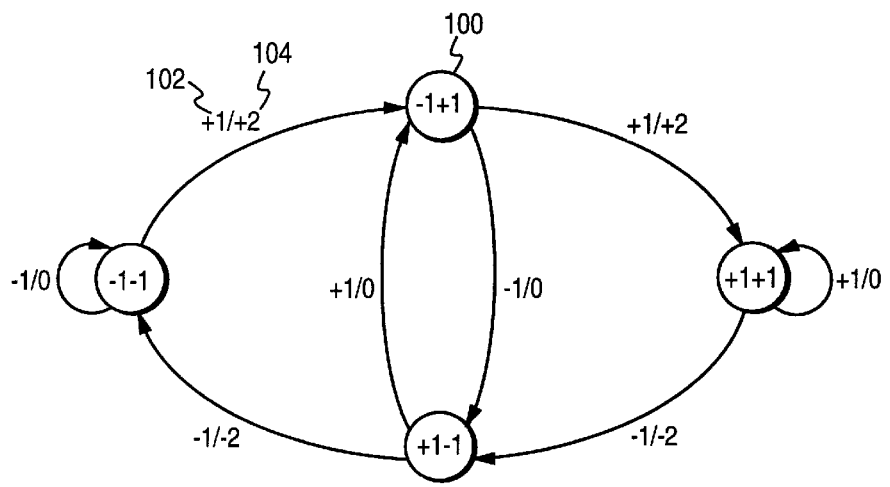
FIG. 4A is a state transition diagram for a PR4 sequence detector.

Zoned recording is a technique known in the art for increasing the storage density by recording the user data at different rates in predefined zones between the inner diameter and outer diameter tracks. The data rate can be increased at the outer diameter tracks due to the increase in circumferential recording area and the decrease in intersymbol interference. This allows more data to be stored in the outer diameter tracks as is illustrated in FIG. 4A where the disk is partitioned into an outer zone 20 comprising fourteen data sectors per track, and an inner zone 22 comprising seven data sectors per track. In practice, the disk is actually partitioned into several zones with increasing data rates from the inner to outer diameter zones.

Figure 2B:
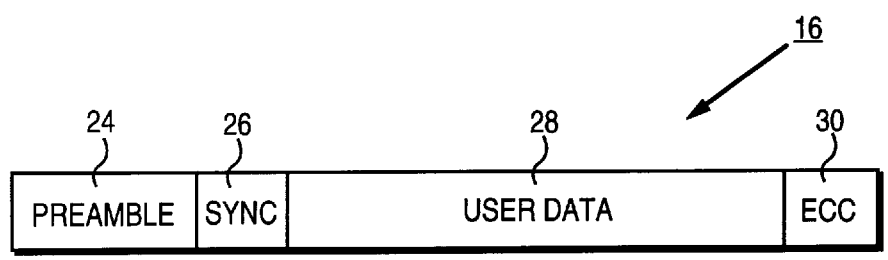
FIG. 2B shows a typical format for a data sector.

FIG. 2B shows the format of a data sector 16 comprised of an acquisition preamble 24, a sync mark 26, a user data field 28, and appended ECC bytes 30 for use in detecting and correcting errors in the user data upon readback. Timing recovery 68 of FIG. 3 processes the acquisition preamble 24 to acquire the correct data frequency and phase before reading the user data field 28, and the sync mark 26 demarks the beginning of the user data field 28 for use in symbol synchronizing the user data. In one embodiment of the present invention, the user data 28 are encoded according to an error detection channel code for enhancing the performance of the post processor 95 of FIG. 3 as described in greater detail below.

SAMPLED AMPLITUDE READ CHANNEL

Figure 3:
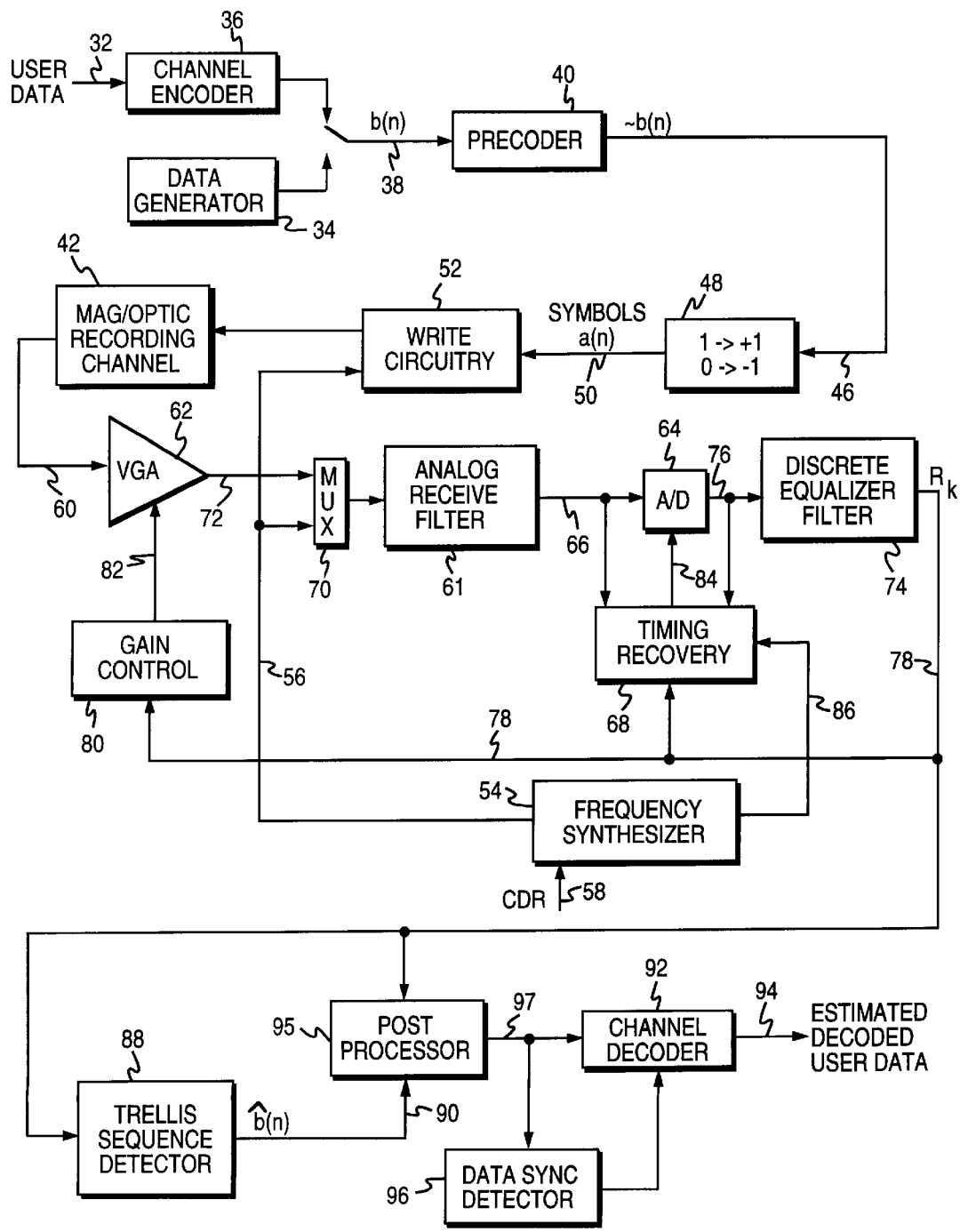
FIG. 3 shows a block diagram of a sampled amplitude read channel employing the post processor of the present invention.

Referring now to FIG. 3, shown is a block diagram of the sampled amplitude read channel of the present invention.

During a write operation, the read channel receives user data over line 32 from the host system. A data generator 34 generates the preamble 24 of FIG. 2B (for example 2T preamble data) written to the disk prior to writing the user data 28. The data generator 34 also generates the sync mark 26 of FIG. 2B for use in symbol synchronizing to the user data 28 during a read operation. A channel encoder 36 encodes a channel code into the data written to the disk, for example, a run-length-limited (RLL) (d,k) constraint or a maximum transition run-length constraint such as described in the above referenced patent application entitled "A SAMPLED AMPLITUDE READ CHANNEL EMPLOYING A TRELLIS SEQUENCE DETECTOR MATCHED TO A CHANNEL CODE CONSTRAINT AND A POST PROCESSOR FOR CORRECTING ERRORS IN THE DETECTED BINARY SEQUENCE USING THE SIGNAL SAMPLES AND AN ERROR SYNDROME." As described in the aforementioned patent application, the channel encoder 36 may also encode redundancy bits into the write data to implement an error detection channel code for use by a post processor in correcting errors made by the trellis sequence detector. Employing an error detection channel code is an optional aspect of the present invention, but as described in greater detail below, it is also the preferred embodiment.

After encoding 36 the channel code, a precoder 40 precodes the binary input sequence b(n) 38 in order to compensate for the transfer function of the recording channel 42 and equalizing filters. The resulting write sequence ~b(n) 46 modulates 48 the current of write circuitry 52, thereby modulating the current in the recording head coil (or intensity of a laser beam) at the zone baud rate to record a sequence of transitions onto the disk 42 which represent the recorded data. In NRZ recording, a "1" bit modulates 48 a positive polarity in the write current and a "0" bit modulates 48 a negative polarity. A frequency synthesizer 54 provides a baud rate write clock 56 to the write circuitry 52 and is adjusted by a baud or channel data rate signal (CDR) 58 according to the current zone the recording head is over.

When reading the recorded binary sequence from the media, timing recovery 68 first locks to the write frequency of the zone by selecting, as the input to the read channel, the write clock 56 through a multiplexer 70. Once locked to the write frequency, which is the nominal sampling frequency, the multiplexer 70 selects the signal 72 from the read head as the input to the read channel in order to acquire the acquisition preamble 24 recorded on the disk prior to the recorded user data 28 as shown in FIG. 2B. A variable gain amplifier 62 adjusts the amplitude of the analog read signal 60, and an analog receive filter 61 provides initial equalization toward the desired response as well as attenuating aliasing noise. A sampling device 64 samples the analog read signal 66 from the analog filter 61, and a discrete-time equalizer filter 74 provides further equalization of the sample values 76 toward the desired response. Table 1 shows normalized values for the PR4, EPR4 and EEPR4 dipulse responses of FIG. 1B:

TABLE 1

| Channel | Transfer Function | Dipulse Response |
| --- | --- | --- |
| PR4 | (1 − D) (1 + D) | 0, 1, 0, −1, 0, 0, 0, . . . |
| EPR4 | (1 − D) (1 + D)$^2$ | 0, 1, 1, −1, −1, 0, 0, . . . |
| EEPR4 | (1 − D) (1 + D)$^3$ | 0, 1, 2, 0, −2, −1, 0, . . . |

The discrete-time equalizer filter 74 may be implemented as a real-time adaptive filter which compensates for parameter variations over the disk radius (i.e., zones), disk angle, and environmental conditions such as temperature drift.

After equalization, the equalized sample values 78 are applied to a decision directed gain control 80 and timing recovery 68 circuit for adjusting the amplitude of the read signal 60 and the frequency and phase of the sampling device 64, respectively. Gain control 80 adjusts the gain of variable gain amplifier 62 over line 82 in order to match the magnitude of the channel's frequency response to the desired partial response, and timing recovery 68 adjusts the frequency of sampling device 64 over line 84 in order to synchronize the equalized samples 78 to the baud rate. Frequency synthesizer 54 provides a course center frequency setting to the timing recovery circuit 68 over line 86 in order to center the timing recovery frequency over temperature, voltage, and process variations.

The sampling device 64 is shown in FIG. 3 as an analog-to-digital (A/D) converter. However, those skilled in the art understand that the sampling device 64 could be a simple sample and hold circuit for converting the analog read signal 66 into a sequence of discrete-time analog samples, and the downstream circuitry, such as the discrete-time equalizer filter 74, timing recovery 68, gain control 80, etc., could be implemented using conventional discrete-time analog (DTA) circuitry. In an alternative embodiment the read channel could be implemented using a hybrid of DTA and digital circuits; for example, the discrete-time equalizer filter 74 could be implemented using DTA, the equalized sample values 78 converted to digital values, and the sequence detector 88 implemented using digital circuitry.

In the preferred embodiment, the discrete-time equalizer 74 equalizes the sample values 76 into a PR4 response so that a simple slicer circuit (not shown) can generate estimated sample values for use in the timing recovery 68 and gain control 80 decision-directed feedback loops. The PR4 equalized samples 78 are then passed through a (1+D)$^n$ filter to generate sample values in the partial response domain of the trellis sequence detector 88. For implementation details concerning various alternative embodiments for sample value estimation for timing recovery 68 and gain control 80, see the above referenced U.S. Pat. No. 5,585,975, "EQUALIZATION FOR SAMPLE VALUE ESTIMATION AND SEQUENCE DETECTION IN A SAMPLED AMPLITUDE READ CHANNEL."

The synchronous, equalized samples 78 are ultimately input into a trellis sequence detector 88 which detects an estimated sequence ^b(n) 90 from the sample values. A post processor 95 processes the preliminary sequence ^b(n) 90 and the channel samples 78 to detect and correct the most likely errors made by the trellis sequence detector. As described in greater detail below, the post processor 95 comprises a sample error filter which effectively whitens the noise in the read signal. In this manner, the trellis sequence detector 88 in combination with the post processor 95 and sample error filter provide a performance enhancing gain by compensating for the noise correlating effect of the channel equalizers; that is, the present invention provides a better approximation to a true maximum likelihood detector.

The corrected binary sequence 97 output by the post processor 95 is decoded by a channel decoder 92 which implements the inverse operation of the channel encoder 36 to thereby generate an estimated user data sequence 94. A data sync detector 96 detects the sync mark 26 (shown in FIG. 2B) in the data sector 16 in order to frame operation of the channel decoder 92. A detailed description of the trellis sequence detector 88 and post processor 95, including the performance enhancing aspects of the sample error filter and error detection channel code, is provided in the following sections.

Trellis Sequence Detector

The general operation of the trellis sequence detector 88 shown in FIG. 3 is understood from the state transition diagram for a simple PR4 sequence detector shown in FIG. 4A. Each state 100 is represented by the last two input symbols (in NRZ after preceding), and each branch from one state to another is labeled with the current input symbol in NRZ 102 and the corresponding sample value 104 it will produce during readback. The demodulation process of the PR4 sequence detector is understood by representing the state transition diagram of FIG. 4A as a trellis diagram shown in FIG. 4B. The trellis diagram represents a time sequence of sample values and the possible recorded input sequences that could have produced the sample sequence. For each possible input sequence, an error metric is computed relative to a difference between the sequence of expected sample values that would have been generated in a noiseless system and the actual sample values output by the channel. For instance, a Euclidean metric is computed as the accumulated square difference between the expected and actual sample values. The input sequence that generates the smallest Euclidean metric is the most likely sequence to have created the actual sample values because it is the "closest" valid sequence to the actual sample values; this sequence is therefore selected as the output of the sequence detector.

To facilitate the demodulation process, the sequence detector comprises path memories for storing each of the possible input sequences and a corresponding metric. A well known property of the sequence detector is that the paths storing the possible input sequences will "merge" into a most likely input sequence after a certain number of sample values are processed, as long as the input sequence is appropriately constrained through use of a channel code. In fact, the maximum number of path memories needed equals the number of states in the trellis diagram; the most likely input sequence will always be represented by one of these paths, and these paths will eventually merge into one path (i.e., the most likely input sequence) after a certain number of sample values are processed.

Figure 4B:
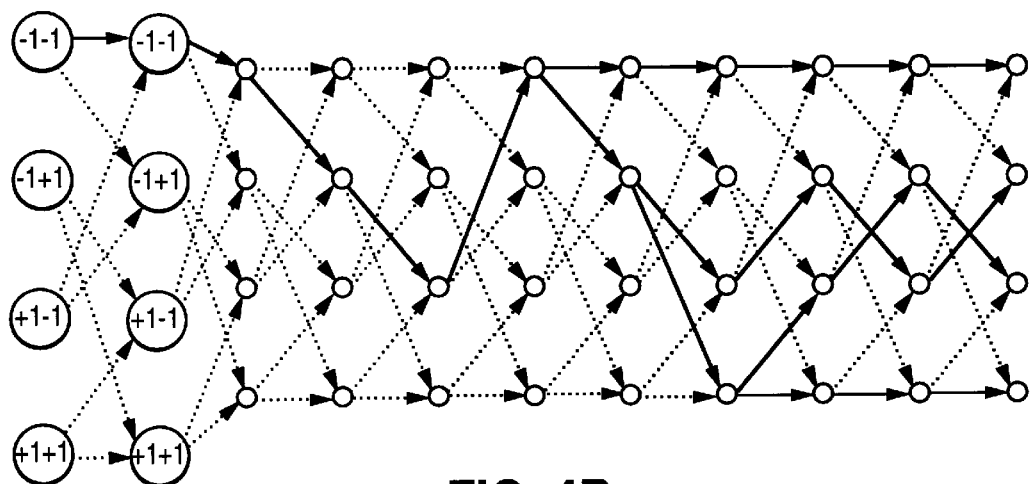
FIG. 4B is a trellis diagram corresponding to the PR4 state transition diagram of FIG. 4A showing the path memory and survivor sequence for a given input sequence.
Figure 5A:
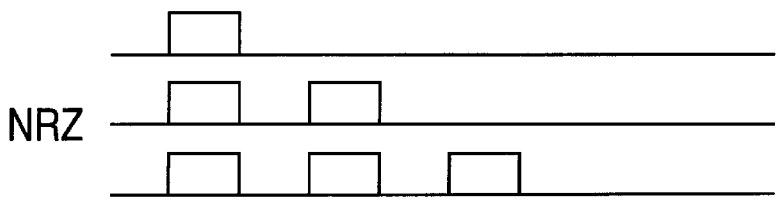
FIGS. 5A–5D show the dominant minimum distance error events of a PR4 sequence detector in NRZ, PR4, EPR4 and EEPR4 space, respectively.
Figure 5B:
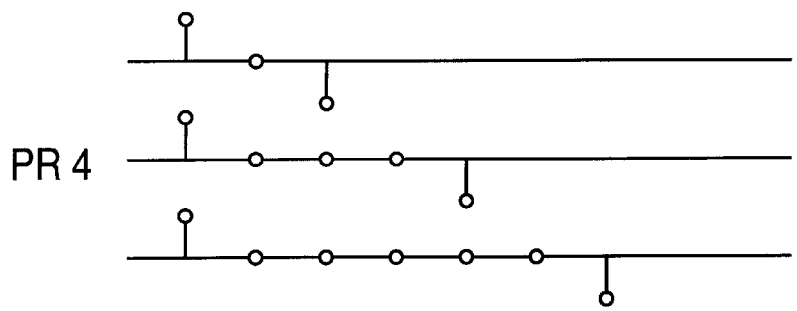
Figure 5C:
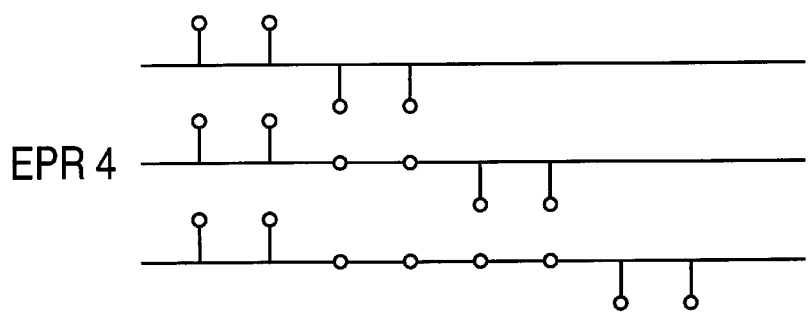
Figure 5D:
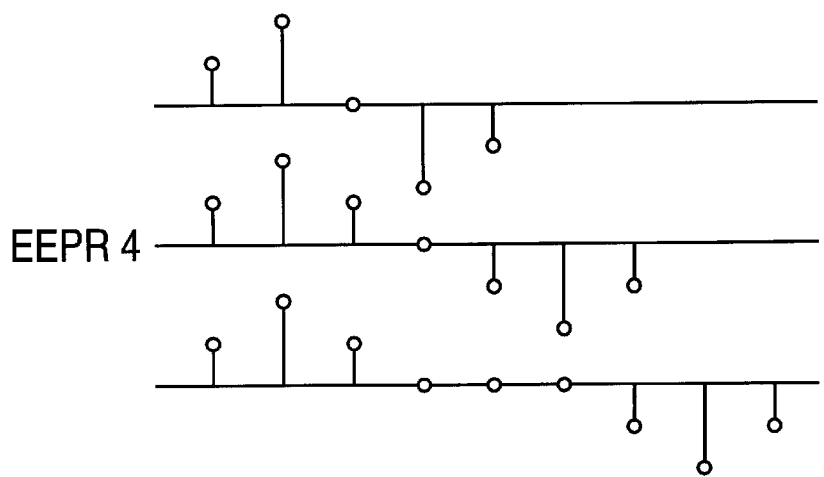

The "merging" of path memories is understood from the trellis diagram of FIG. 4B where the "survivor" sequences are represented as solid lines. Notice that each state in the trellis diagram can be reached from one of two states; that is, there are two transition branches leading to each state. With each new sample value, the Viterbi algorithm recursively computes a new error metric and retains a single survivor sequence for each state corresponding to the minimum error metric. In other words, the Viterbi algorithm will select one of the two input branches into each state since only one of the branches will correspond to the minimum error metric, and the paths through the trellis corresponding to the branches not selected will merge into the paths that were selected. Eventually, all of the survivor sequences will merge into one path through the trellis which represents the most likely estimated data sequence to have generated the sample values as shown in FIG. 4B.

In some cases, if the input sequence is not appropriately constrained through the use of a channel code, the path memories will not merge into one survivor sequence. Consider the PR4 trellis shown in FIG. 4B; an input sequence of all zeros or all ones will prevent the paths from merging which leads to multiple possible survivor sequences output by the detector. Data sequences which prevent the path memories from merging are referred to as "quasi-catastrophic" data sequences since they result in quasi-catastrophic errors in the output sequence. In order to avoid quasi-catastrophic errors, a channel code is typically employed which codes out of the recorded data all sequences which can prevent the path memories from merging.

Even if the quasi-catastrophic data sequences are coded out of the input sequence, the sequence detector can still make an error in detecting the output sequence if enough destructive noise is present in the read signal. The possible output sequences are different from one another by a minimum Euclidean distance; a detection error typically occurs when the signal noise breaches this minimum distance between valid output sequences. FIGS. 5A–5D illustrate the sample error sequences associated with the dominant minimum distance error events of a PR4 sequence detector in NRZ, PR4, EPR4 and EEPR4 space, respectfully. In general, a higher order sequence detector will outperform a lower order sequence detector due to the number of data samples the error event affects. Consider, for example, the first error event in the NRZ space shown. in FIG. 5A. This error event generates two noise samples which corrupt two data samples (two output bits) in the PR4 space of FIG. 5B, four noise samples in the EPR4 space of FIG. 5C, and four noise samples with two having increased magnitude in the EEPR4 space of FIG. 5D. This "spreading out" of the error event reduces the probability of a detection error.

A minimum distance error event can occur where the data sequences diverge from a particular state in the trellis and then remerge at a later state. In a perfect system, all of the minimum distance error events will occur with equal probability. However, because the channel equalizers correlate the noise in the signal samples, the minimum length, minimum distance error events are more likely to occur. Thus, the error events shown in FIGS. 5A–5D are the "dominant" minimum distance error events because they are shortest in length. The first error event ((+) in NRZ), which is the shortest error event, is typically the most dominant; however, depending on the partial response polynomial employed, other error events may become the most dominant as the linear bit density increases.

An increase in performance can be achieved by employing a channel code to code out data sequences associated with the minimum distance error events (similar to coding out the quasi-catastrophic data sequences), and then to match the sequence detector to this channel code using conventional trellis coded modulation (TCM) techniques. For example, the minimum distance error events shown in FIG. 5A can be coded out by removing the bit sequences consisting of (1,0,1) or (0,1,0) from the input sequence. The state machine of a PR4 sequence detector can then be matched to this code constraint by removing the inner branches shown in FIG. 4A. With these branches removed, the minimum distance of the PR4 sequence detector increases from $dmin^2=2$ to $dmin^2=4$ (with the signal samples normalized to +1, 0, −1).

Although matching the trellis state machine to a channel code constraint often provides a significant increase in detector performance, there are certain drawbacks. For instance, employing a simple RLL d=1 constraint to code out the inner branches of the PR4 state machine shown in FIG. 4A typically requires a code rate of $\frac{2}{3}$ which is a significant reduction in bandwidth. More complex channel codes with higher code rates can be employed, but this usually increases, significantly, the cost and complexity of matching the state machine of the trellis sequence detector to the code constraint. One aspect of the present invention, then, is to employ a channel code and a post processor 95 which approximate the performance enhancing gain provided by matching the trellis state machine to the channel code constraint, but with a significant reduction in cost and complexity.

Another aspect of the present invention is to attenuate the noise correlating effect of the channel equalizers described above which also degrades the performance of the trellis sequence detector 88 which is a maximum likelihood detector only if the signal noise is white (statistically independent) with a Gaussian probability distribution. Furthermore, the amount of equalization required and the degree of correlation varies depending on the partial response target and the channel density employed. Thus, even though the equalizers may not increase the signal noise (particularly a digital equalizer), the noise correlating effect of the equalizer decreases the system's performance due to the adverse affect on the trellis sequence detector 88. The present invention addresses this problem by providing a post processor 95 shown in FIG. 3 for detecting and correcting errors in the preliminary sequence 90 output by the trellis sequence detector 88. The errors are detected and corrected in a manner that effectively whitens the noise in the read signal (i.e., reverses the correlation effect of the equalizers), thereby approaching the performance of a true maximum likelihood detector.

Post Processor

Before disclosing details of implementation, a mathematical basis for the invention is provided to better understand the operation of the post processor 95 shown FIG. 3. The noise component of the read signal 60 at the input to the read channel is substantially white, but then it is correlated by the analog receive filter 61 and the discrete equalizer filter 74 of FIG. 3. Given that the combined transfer function of these filters is $$G(e^{j\omega t})$$

then the noise in the read signal at the output of these filters can be whitened by passing the read signal through a noise whitening filter with a transfer function that is the inverse of the equalizers' transfer function $$H(\_i\ e^{j\omega t}) = G^{-1}(e^{j\omega t}).$$

Of course, the read signal has already been sampled at the output of the discrete equalizer 74, so the noise whitening filter would be implemented in discrete time with a transfer function $$H(e^{jk\theta})$$

and having a discrete impulse response $h_k$. Alternatively, the noise could be extracted from the read signal and then passed through a noise whitening filter. In the latter embodiment, the noise whitening filter is not necessarily the inverse of the channel equalizer filters.

The noise sequence $n_k$ can be extracted from the read signal by remodulating the preliminary sequence output by the trellis sequence detector 88 into a sample sequence $S_k$ in the partial response domain, and then subtracting the remodulated sequence $S_k$ from the actual read signal samples $R_k$ $$n_k = R_k - S_k.$$

The above noise sequence $n_k$ will be accurate as long as the trellis sequence detector 88 does not make a detection error. Assuming, however, that the sequence detector 88 makes a detection error due to the noise correlating effect of the channel equalizers, then the correct sample sequence $T_k$ can be represented by $$T_k = S_k + E_k$$

where $E_k$ is the sample error sequence that, when added to the detected sample sequence $S_k$, generates the correct sample sequence $T_k$. Combining the above equations leads to $$T_k - R_k = S_k + E_k - n_k - S_k = E_k - n_k$$

where $T_k - R_k$ represents the sample error sequence or difference between the received (noise correlated) sample sequence $R_k$ and the correct sample sequence $T_k$.

As described above the function of the trellis sequence detector 88 is to minimize the sum of the squared errors in selecting the most likely sequence associated with the received signal samples; however, because the noise in the read signal has been correlated by the channel equalizers, the trellis detector at times selects the wrong sequence. The general idea of the present invention, then, is to employ a post processor 95 that effectively whitens the sample error sequence between the received (noise correlated) sample sequence 78 and corrected sample sequences assuming that the sequence detector 88 has made a particular error, for example, an error shown in FIG. 5A–5D. The whitened noise sequence is then evaluated by the post processor 95 to determine if the corrected sample sequence is closer to the noise-whitened signal samples in Euclidean space (sum of squared errors) than the sample sequence originally detected by the trellis sequence detector 88. If so, then the post processor 95 corrects the preliminary sequence ^b(n) 90 output by the trellis sequence detector 88 to generate a corrected sequence 97 decoded by the channel decoder 92.

Minimizing the sample error sequence in Euclidean space can be represented mathematically using the above equations $$\text{MIN}\|(T_k - R_k) * h_k\|^2 \tag{1}$$

which from the above equations is equivalent to $$\text{MIN}\|(E_k - n_k) * h_k\|^2 \tag{2}$$

where $h_k$ is the impulse response of a noise whitening filter. Equation (2) can be rewritten as $$\text{MIN}\left\|\sum_{j=0}^{N} E_{k-j} h_j - \sum_{m=0}^{N} n_{k-m} h_m\right\|^2 \tag{3}$$

where N is the length of the impulse response $h_k$ of the noise whitening filter. Equation (3) can be rewritten as $$\text{MIN} \sum_{k=0}^{L}\left(\sum_{j=0}^{N} E_{k-j} h_j - \sum_{m=0}^{N} n_{k-m} h_m\right)^2 \tag{4}$$

where L is the length of the received sample sequence, and equation (4) can be rewritten as $$\text{MIN} \sum_{k=0}^{L} \left[ \left( \sum_{j=0}^{N} E_{k-j} h_j \right)^2 - 2 \sum_{j=0}^{N} E_{k-j} h_j \sum_{m=0}^{N} n_{k-m} h_m + \left( \sum_{m=0}^{N} n_{k-m} h_m \right)^2 \right]. \quad (5)$$

In equation (5), the term $$\sum_{m=0}^{N} n_{k-m} h_m$$

represents the whitened noise in the read signal assuming that the trellis sequence detector 88 did not make a detection error. If, however, the trellis sequence detector 88 makes a detection error due to the noise correlating effect of the channel equalizers, then the term $$\sum_{k=0}^{L} \left[ \left( \sum_{j=0}^{N} E_{k-j} h_j \right)^2 - 2 \sum_{j=0}^{N} E_{k-j} h_j \sum_{m=0}^{N} n_{k-m} h_m \right] \quad (6)$$

in equation (5) will be negative and the output of equation (5) will be smaller than if $E_k$ were zero. In other words, whitening the difference (noise) between the corrected sample sequence and the received signal samples $(T_k - R_k)$ will result in a Euclidean distance that is closer to the corrected sample sequence $T_k$ as compared to the Euclidean distance to the sample sequence $S_k$ selected by the trellis sequence detector 88. Therefore, the sample sequence $S_k$ detected by the trellis sequence detector 88 should be corrected relative to the error event sequence $E_k$ since minimizing the Euclidean distance will better approximate a true maximum likelihood sequence detector. An aspect of the present invention, then, is to calculate equation (6) for various error event sequences $E_k$, and to correct the preliminary sequence ^b(n) 90 detected by the trellis sequence detector 88 if the result of equation (6) is negative.

The first term in equation (6) is a constant because the error sequence $E_k$ associated with the error event is known (e.g., an error event shown in FIGS. 5A–5D). This term reduces to $$\sum_{k=0}^{L} \left( \sum_{j=0}^{N} E_{k-j} h_j \right)^2 = \sum_{k=0}^{L} \sum_{j=0}^{N} E_{k-j} h_j \sum_{m=0}^{N} E_{k-m} h_m = \quad (7)$$

$$\sum_{k=0}^{L} \sum_{j=k-N}^{k} E_j h_{k-j} (E_k * h_k) = \sum_{j=0}^{L} E_j \sum_{k=0}^{L} h_{k-j} (E_k * h_k) =$$

$$\sum_{j=0}^{L} E_j (h_{-k} * E_k * h_k)_j = \sum_{j=0}^{L} E_j (E_k * h_k * h_{-k})_j.$$

Referring again to equation (6), the term on the right reduces to $$\sum_{k=0}^{L} \left( 2 \sum_{j=0}^{N} E_{k-j} h_j \sum_{m=0}^{N} n_{k-m} h_m \right) = 2 \sum_{k=0}^{L} \sum_{j=0}^{N} E_{k-j} h_j \sum_{m=0}^{N} n_{k-m} h_m = \quad (8)$$

$$2 \sum_{k=0}^{L} \sum_{j=k-N}^{k} E_j h_{k-j} (n_k * h_k) = 2 \sum_{j=0}^{L} E_j \sum_{k=0}^{L} h_{k-j} (n_k * h_k) =$$

$$2 \sum_{j=0}^{L} E_j (h_{-k} * n_k * h_k)_j = 2 \sum_{j=0}^{L} E_j (n_k * h_k * h_{-k})_j.$$

Combining equations (7) and (8) leads to the following representation for equation (6)

$$\sum_{j=0}^{L} E_j (E_k * h_k * h_{-k})_j - 2 \sum_{j=0}^{L} E_j (n_k * h_k * h_{-k})_j. \quad (9)$$

A mathematical derivation is provided below for an approximation of the impulse response $h_k$ convolved with the time reversal of itself $h_{-k}$ ($h_k * h_{-k}$ in equation (9)). Once the approximated coefficients for $h_k * h_{-k}$ are determined, the solution to equation (9) is complete since all other terms are known. Thus, a number of error event sequences $E_k$ can then be substituted into equation (9) to determine if the trellis sequence detector 88 made a detection error corresponding to the particular error event $E_k$.

The coefficients of $h_k * h_{-k}$ in equation (9) can be determined using auto-correlation. The auto-correlation of the output sequence of a perfect noise whitening filter is an impulse response $\delta_k$. Therefore, the coefficients $h_k$ of a noise whitening filter will satisfy the following equation $$R_{yy}(\tau) - \delta(\tau) = 0$$

where $R_{yy}(\tau)$ represents the auto-correlation of the output sequence. In order to satisfy the above equation, the impulse response $h_k$ would comprise an infinite number of terms; however, because the impulse response also decreases monotonically on average, it can be approximated with a finite length impulse response that satisfies the least-mean-square (LMS) of the above equation $$\text{MIN} \| R_{yy}(\tau) - \delta(\tau) \|^2. \quad (10)$$

In equation (10), the auto-correlation $R_{yy}(\tau)$ of the output sequence can be written in terms of $h_k * h_{-k}$ together with the auto-correlation of the input sequence, which leads to a solution for the approximated coefficients for $h_k * h_{-k}$.

The auto-correlation $R_{yy}(\tau)$ of a filter's output sequence $Y_k$ is $$E\{Y_k Y_{k-\tau}\} \quad (11)$$

where E is the expectation operator. The auto-correlation of the output sequence $Y_k$ for a filter can be generated by multiplying the input sequence $X_k$ convolved with filter's impulse response by a time-shifted input sequence $X_{k-\tau}$ convolved with the filter's impulse response $$E \left\{ \sum_{j=0}^{N} h_j X_{k-j} \sum_{m=0}^{N} h_m X_{k-\tau-m} \right\} \quad (12)$$

where N is the length of the filter's impulse response $h_k$. Equation (12) can be reduced to $$E\left\{\sum_{j=0}^{N} h_j X_{k-j} \sum_{m=0}^{N} h_m X_{k-\tau-m}\right\} = \tag{13}$$

$$\sum_{j=0}^{N} h_j \sum_{m=0}^{N} h_m E\{X_{k-j} X_{k-\tau-m}\} = \sum_{j=0}^{N} h_j \sum_{m=0}^{N} h_m R_{xx}(\tau + m - j)$$

where $R_{xx}$ in equation (13) is the auto-correlation of the input sequence $X_k$. Substituting k=m−j and m=k+j, equation (13) can be rewritten as $$\sum_{j=0}^{N} h_j \sum_{k=-j}^{N-j} h_{k+j} R_{xx}(\tau + k). \tag{14}$$

Equation (14) can be further reduced to $$\sum_{k=-N}^{N} \sum_{j=0}^{N} h_j h_{k+j} R_{xx}(\tau + k). \tag{15}$$

To simplify the following notation, equation (15) is rewritten with $$hh_k = \sum_{j=0}^{N} h_j h_{k+j}.$$

to obtain $$R_{yy}(\tau) = \sum_{k=-N}^{N} hh_k R_{xx}(\tau + k). \tag{16}$$

Substituting equation (16) into equation (10) leads to the following LMS equation $$\text{MIN}\left\|\sum_{k=-N}^{N} hh_k R_{xx}(\tau + k) - \delta(\tau)\right\|^2. \tag{17}$$

Equation (17), which is written in terms of the auto-correlation of the input sequence $R_{xx}(\tau+k)$ to the noise whitening filter, can be used to derive the coefficients for the LMS approximation of $hh_k$. In order to solve equation (17) it must be truncated by a preselected length L $$\sum_{\tau=-L}^{L}\left(\sum_{k=-N}^{N} hh_k R_{xx}(\tau + k) - \delta(\tau)\right)^2 \tag{18}$$

where the accuracy of the approximation to equation (17) increases as L increases. The terms of $R_{xx}$ are symmetric about k=0 since it is the auto-correlation of the input sequence. Therefore, equation (18) can be rewritten as $$\sum_{\tau=-L}^{L}\left(\sum_{k=0}^{N} hh_k (R_{xx}(\tau + k) + R_{xx}(\tau - k))\left(1 - \frac{1}{2}\delta(k)\right) - \delta(\tau)\right)^2. \tag{19}$$

The minimum of equation (19) in terms of $hh_n$ can be found by calculating when the partial derivative of equation (19) with respect to $hh_n$ is zero $$\frac{\partial}{\partial hh_n} = \sum_{\tau=-L}^{L} 2\left(\sum_{k=0}^{N} hh_k (R_{xx}(\tau + k) + R_{xx}(\tau - k))\left(1 - \frac{1}{2}\delta(k)\right) - \delta(\tau)\right) \cdot$$

$$(R_{xx}(\tau + n) + R_{xx}(\tau - n))\left(1 - \frac{1}{2}\delta(n)\right) = 0.$$

Rearranging terms in the above equation leads to $$\sum_{\tau=-L}^{L} \sum_{k=0}^{N} hh_k (R_{xx}(\tau + k) + R_{xx}(\tau - k))\left(1 - \frac{1}{2}\delta(k)\right) \cdot$$

$$(R_{xx}(\tau + n) + R_{xx}(\tau - n))\left(1 - \frac{1}{2}\delta(n)\right) =$$

$$(R_{xx}(n) + R_{xx}(n))\left(1 - \frac{1}{2}\delta(n)\right).$$

which further reduces to $$\sum_{k=0}^{N} hh_k \sum_{\tau=-L}^{L} (R_{xx}(\tau + k) + R_{xx}(\tau - k))\left(1 - \frac{1}{2}\delta(k)\right) \cdot (R_{xx}(\tau + n) + \tag{20}$$

$$R_{xx}(\tau - n))\left(1 - \frac{1}{2}\delta(n)\right) = 2R_{xx}(n)\left(1 - \frac{1}{2}\delta(n)\right).$$

Equation (20) can be written in matrix form $$\left(\begin{bmatrix} \frac{1}{2}R_{-L} & \cdots & \frac{1}{2}R_L \\ R_{-L+1} & & R_{L+1} \\ \vdots & & \vdots \\ R_{-L+N} & \cdots & R_{L+N} \end{bmatrix}\right. +$$

$$\begin{bmatrix} \frac{1}{2}R_L & \cdots & \frac{1}{2}R_{-L} \\ R_{L+1} & & R_{-L+1} \\ \vdots & & \vdots \\ R_{L+N} & \cdots & R_{-L+N} \end{bmatrix}\right)\left(\begin{bmatrix} \frac{1}{2}R_{-L} & R_{-L+1} & \cdots & R_{-L+N} \\ \vdots & & & \vdots \\ \vdots & & & \vdots \\ \frac{1}{2}R_L & R_{L+1} & \cdots & R_{L+N} \end{bmatrix} +$$

$$\begin{bmatrix} \frac{1}{2}R_L & R_{-L+1} & \cdots & R_{-L+N} \\ \vdots & & & \vdots \\ \vdots & & & \vdots \\ \frac{1}{2}R_{-L} & R_{L+1} & \cdots & R_{-L+N} \end{bmatrix}\right)\begin{bmatrix} hh_0 \\ \vdots \\ \vdots \\ hh_N \end{bmatrix} = \begin{bmatrix} \frac{1}{2}R_0 \\ \vdots \\ \vdots \\ R_N \end{bmatrix} 2.$$

A solution for $hh_k$ can be found from the above matrix equation using well known techniques; all that is needed is the auto-correlation values for the input sequence $X_k$. The solution for $hh_k$ will be at least four non-zero real numbers or coefficients, where each coefficient comprises an integer and a fractional component.

As described in more detail below, the input sequence $X_k$ is the estimated noise sequence nk generated as the difference between the sample sequence detected by the trellis sequence detector 88 and the actual signal samples. Thus, the auto-correlations of the estimated noise sequence $n_k$ are computed and substituted into the above matrix equation in order to derive approximated coefficients for $hh_k$ ($h_k * h_{-k}$ of equation (9)). A more accurate approximation for $hh_k$ is provided by calculating $R_{xx}$ over longer signal sample sequences, and by averaging $R_{xx}$ for a number of different signal sample sequences generated from different data sequences recorded on the disk storage medium.

In the preferred embodiment, the read channel comprises only the circuitry for computing the auto-correlation of the noise sequence $n_{xx}(\tau)$ for the various values of $\tau$ in the above matrix equation. The auto-correlations are then transferred to a disk controller (not shown) which carries out the matrix computations in solving for $hh_k$. Due to the extensive number of computations, the above-described process for computing approximated coefficients for $hh_k$ is carried out infrequently, for example, only during manufacturing of the storage device or during an off-line calibration process executed periodically during the lifetime of the storage device.

Also in the preferred embodiment, the approximated coefficients for $hh_k$ are calculated for each zone of the disk storage medium (see FIG. 2A and above description of zoned recording). This is necessary because the channel equalizers are adaptively adjusted to operate in each zone. Consequently, the noise correlating effect of the channel equalizers changes across zones which necessitates a corresponding change in $hh_k$. Once the coefficients for $hh_k$ have been determined for each zone, they are stored in memory and loaded into the post processor 95 of FIG. 3 when the recording head crosses over into a new zone.

Figure 1A:
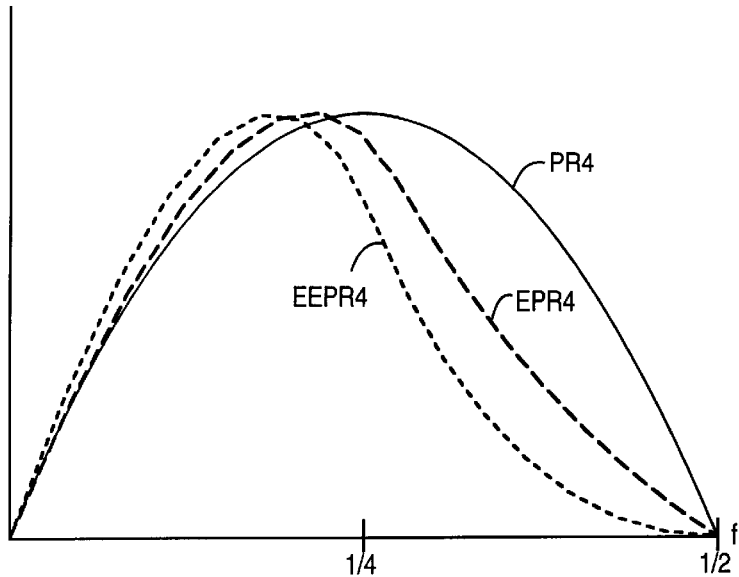
FIG. 1A shows the frequency response for a PR4, EPR4 and EEPR4 read channel.
Figure 1B:
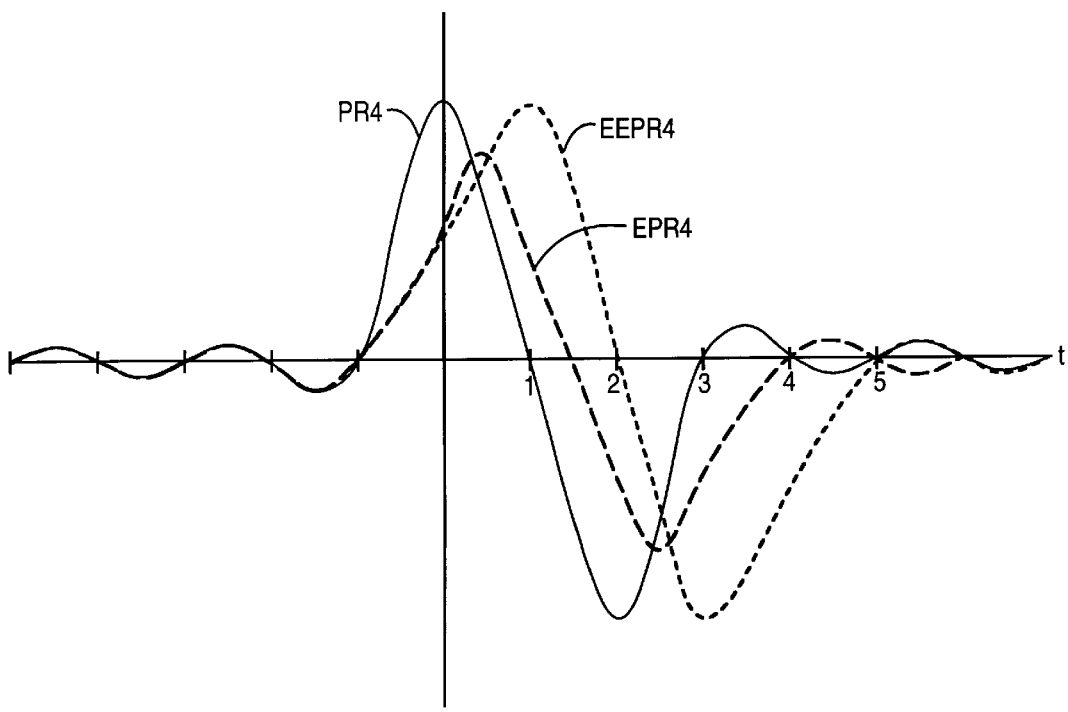
FIG. 1B shows the dipulse responses for the PR4, EPR4 and EEPR4 read channels of FIG. 1A.
Figure 6:
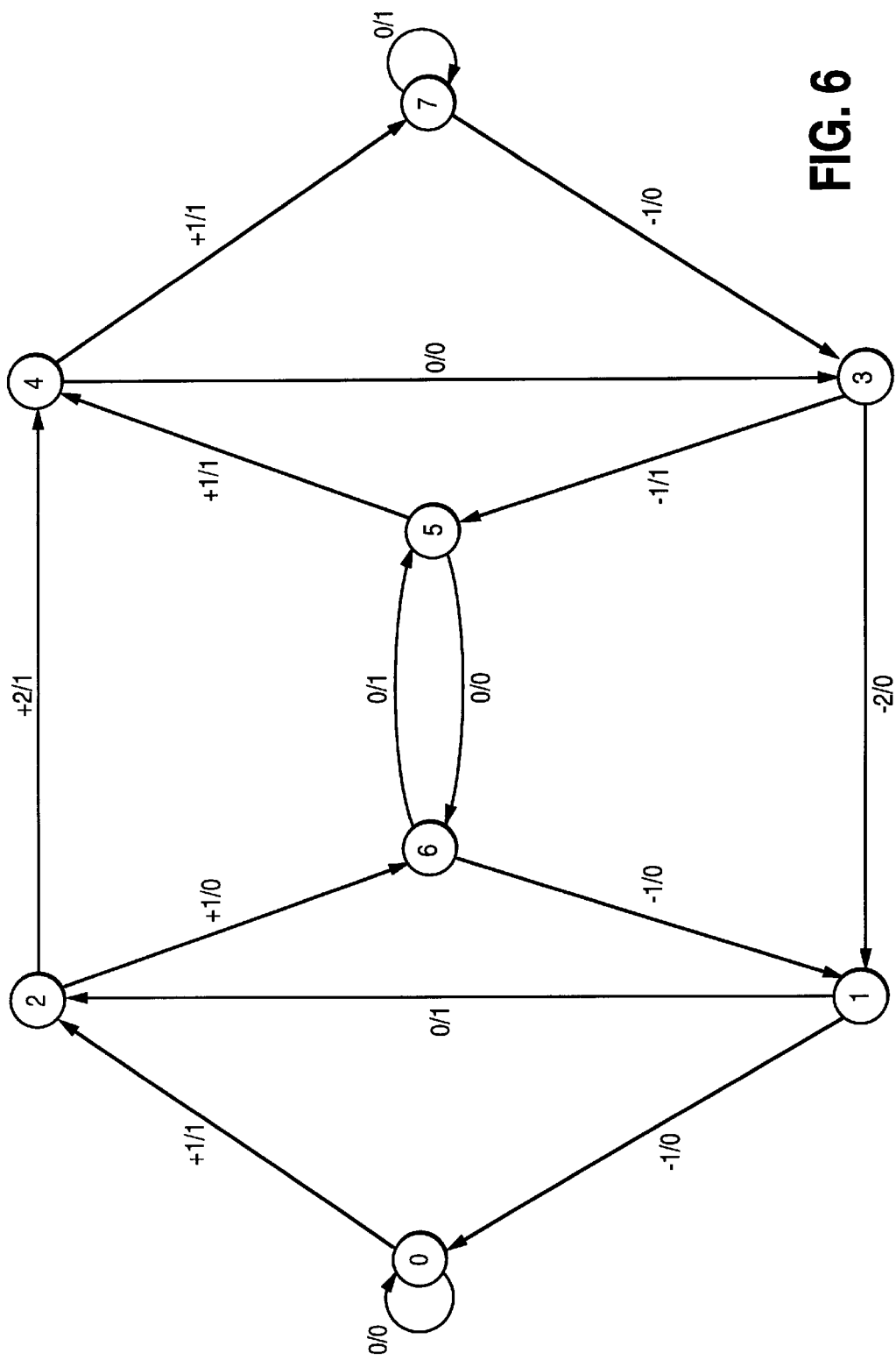
FIG. 6 is a state transition diagram for an EPR4 trellis sequence detector which is the preferred embodiment for the present invention.

Having described a mathematical basis for the operation of the post processor 95, the circuitry for implementing the present invention within the read channel will now be described. In the preferred embodiment, the trellis sequence detector 88 of FIG. 3 is implemented in the EPR4 domain, the state transition diagram for which is shown in FIG. 6 which is similar to the state transition diagram of FIG. 4A described above with reference to a PR4 read channel. The transfer function of an EPR4 read channel is $$1+D-D^2-D^3$$

with a corresponding dipulse response shown in FIG. 1B. The current output of the EPR4 read channel is determined from the current and three previous input symbols a(n) 50 of FIG. 3. Each state in the state transition diagram of FIG. 6 represents one of eight possible values for the three previous input symbols a(n), and each transition branch is labeled with an x/y where x is the current input symbol a(n) 50 and y is the corresponding channel output it will generate in the NRZ domain. The branches are labeled so that the preliminary sequence 90 output by the trellis sequence detector 88 is in the NRZ (write current) domain in order to implement the optional parity channel code described below. Those skilled in the art understand how to implement a trellis sequence detector 88, including the circuitry for implementing the add-compare-select (ACS) modules as well as the path memories used to implement the well known Viterbi algorithm. An example embodiment for an EPR4 trellis sequence detector is disclosed in the above-referenced U.S. Pat. No. 5,291,499 entitled "METHOD AND APPARATUS FOR REDUCED-COMPLEXITY VITERBI-TYPE SEQUENCE DETECTORS."

Figure 7A:
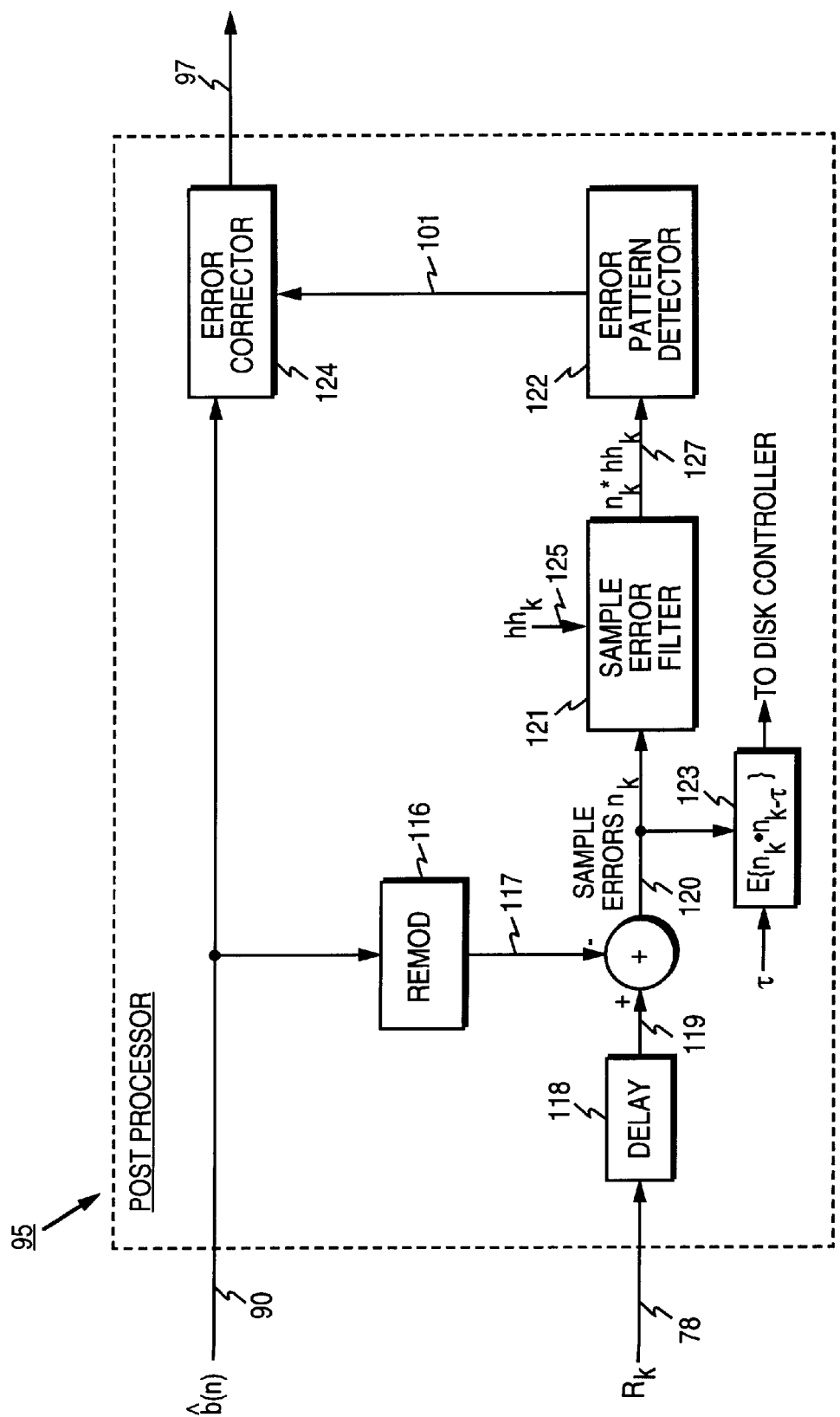
FIG. 7A shows further details of the post processor of the present invention, including a sample error filter for effectively whitening the noise (sample errors $n_k$) in the read signal to facilitate detecting and correcting errors made by the trellis sequence detector.

Referring now to FIG. 7A, shown is a block diagram of the basic elements found in the post processor 95 of FIG. 3. The preliminary sequence ^b(n) 90 output by the trellis sequence detector 88 is remodulated 116 into an estimated or ideal sample sequence 117 corresponding to the partial response domain of the read signal samples 78. The read signal samples 78 are passed through a delay 118 to account for the pipeline delay of the trellis sequence detector 88, and the estimated sample values 117 are then subtracted from the delayed read signal sample values 119 to generate a sequence of sample errors $n_k$ 120 which represents the noise in the read signal assuming that the trellis sequence detector 88 did not make a detection error.

The sample errors nk 120 are filtered by a sample error filter 121 having coefficients $hh_k$ 125. As described above in the mathematical description of the post processor 95, $hh_k$ represents the convolution $h_k * h_{-k}$ where $h_k$ is the impulse response (or approximation thereof) of a noise whitening filter. The filtered sample errors $n_k * hh_k$ 127 are processed by an error pattern detector 122 which implements equation (9) described above in determining whether the trellis sequence detector 88 has made a detection error. If the error pattern detector 122 detects an error it signals 101 an error correction circuit 124 to make the appropriate correction to the preliminary sequence 90 output by the trellis sequence detector 88. The corrected sequence 97 is then output of the post processor 95 and decoded by the channel decoder 92 of FIG. 3.

As described above with reference to equation (20), the coefficients $hh_k$ 125 of the sample error filter 121 can be estimated using the auto-correlation of the sample errors $n_k$ 120 at the input to the sample error filter 121. Thus, the post processor 95 of FIG. 7A further comprises an auto-correlator 123 for computing the auto-correlation of the sample errors nk 120 for the various T offsets in equation (20). The auto-correlations are then transferred to a disk controller (not shown) that comprises a micro-processor and source code for calculating the estimated coefficients $hh_k$ 125 using equation (20). Due to the large number of calculations needed to implement equation (20), the process of computing estimated coefficients $hh_k$ 125 for the sample error filter 121 is carried out infrequently, for example, only during manufacturing of the storage system or during an off-line calibration routine executed periodically throughout the lifetime of the storage device. The estimated coefficients $hh_k$ 125 are then saved in memory and loaded into the sample error filter 121 during normal operation. Because the channel equalizers are reprogrammed with coefficients corresponding to each zone on the storage disk (see FIG. 2A and description of zoned recording), coefficients $hh_k$ 125 are also computed for each zone, saved in memory, and loaded into the sample error filter 121 when the read head transitions into a new zone.

Figure 7B:
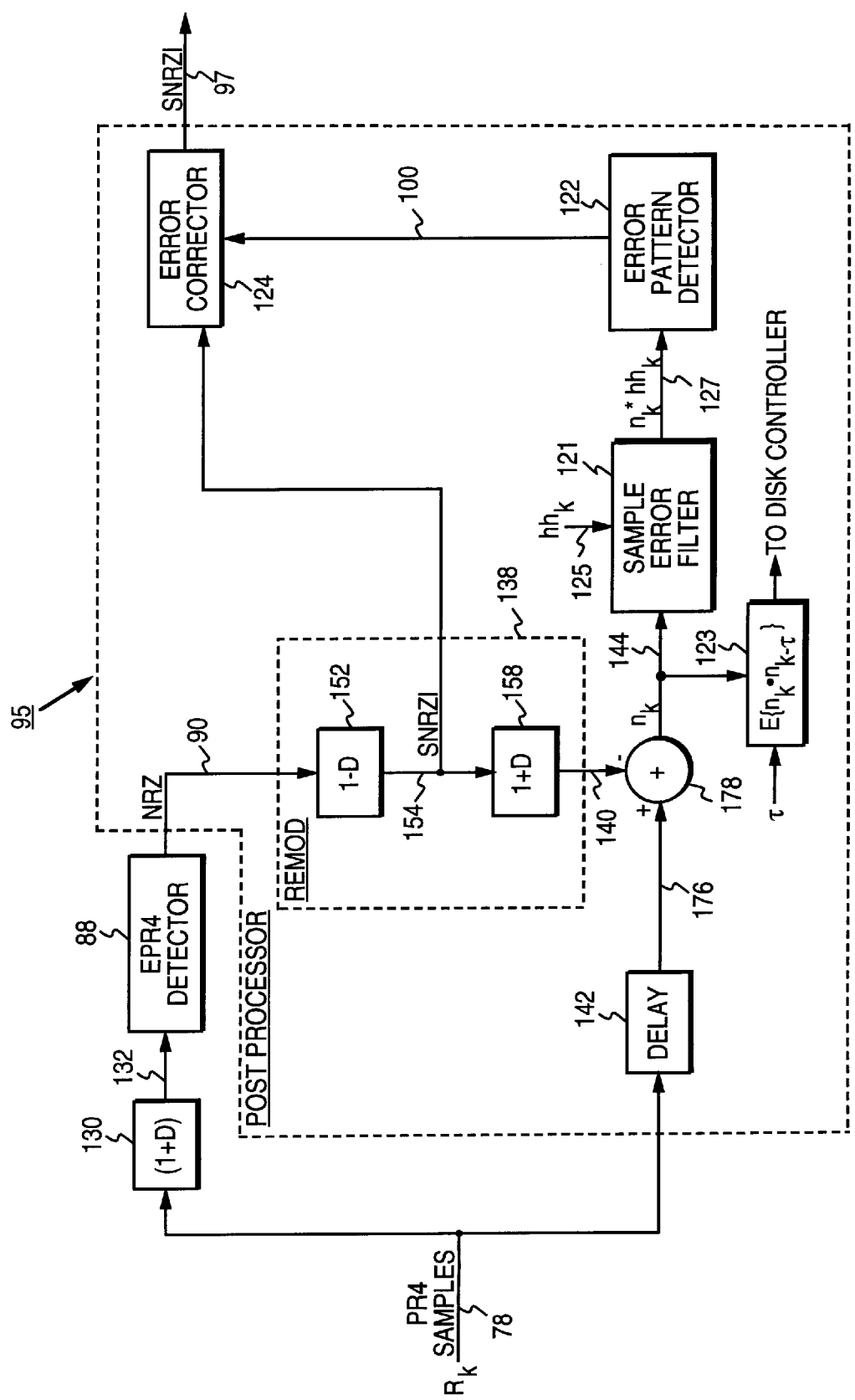
FIG. 7B shows further details of the preferred embodiment for the post processor of the present invention, including an EPR4 trellis sequence detector which outputs an NRZ sequence, and a remodulator for remodulating the detected SNR sequence into a SNRZI sequence and a PR4 sequence.

Turning now to FIG. 7B, shown is the preferred embodiment for the post processor 95 of the present invention. In order to minimize the cost and complexity of the timing recover 68 and gain control 80 circuits shown in FIG. 3, the read signal samples 78 are preferably equalized into a PR4 response. This allows the use of a simple slicer circuit (not shown) for computing estimated sample values used in the timing recovery and gain control feedback loops. A slicer comprises circuitry which compares the read signal samples 78 to thresholds representing the decision boundaries for the ideal samples of a PR4 signal; the slicer outputs an estimated sample corresponding to the decision space that the read signal sample 78 falls into.

Referring again to FIG. 7B, the PR4 read signal samples 78 are filtered by a (1+D) filter 130 to convert the read signal samples into the EPR4 domain 132. The EPR4 read signal samples 132 are then processed by an EPR4 trellis sequence detector 88 which operates according to the state transition diagram shown in FIG. 6. The EPR4 trellis sequence detector 88 outputs a preliminary sequence 90 in the NRZ domain (write current domain). The NRZ sequence 90 is remodulated 138 first into a SNRZI sequence 154 by passing the NRZ sequence 90 through a (1−D) filter 152, and then into an estimated PR4 sample sequence 140 by passing the SNRZI sequence 154 through a (1+D) filter 158. The SNRZI sequence 154 is input into the error corrector 124 and corrected when the error pattern detector 122 detects an error. The estimated PR4 samples 140 are subtracted 178 from the corresponding PR4 read signal samples 176 (after passing through a delay 142 to account for the pipeline delay of the EPR4 detector 88) to generate the sequence of sample errors $n_k$ 144. Similar to FIG. 7A, FIG. 7B also comprises an auto-correlator 123 for use in computing the coefficients $hh_k$ 125 of the sample error filter 121 that are convolved with the sample errors $n_k$ 144 to generate the filtered error sequence $n_k*hh_k$ 127 ultimately processed by the error pattern detector 122.

Figure 8A:
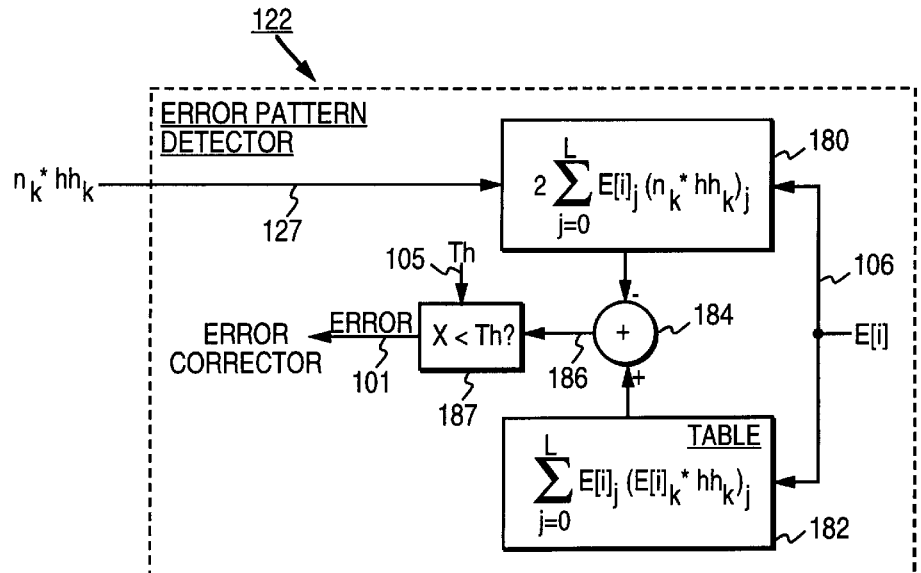
FIG. 8A shows details of the error pattern detector employed in the post processor of the present invention.

Details of the error pattern detector 122 shown in FIG. 7A and FIG. 7B are disclosed in FIG. 8A, the elements of which implement equation (9) discussed above. The filtered error sequence $n_k*hh_k$ 127 is correlated 180 with various error sequences E[i] 106 corresponding to the dominant error events of the trellis sequence detector 88, for example, the error events shown in FIGS. 5A–5D. The correlation 180 implements equation (7) described above. FIG. 8A shows a single correlator 180 for correlating the error sequences E[i] 106 seriatim; however, the preferred embodiment is to employ a plurality of correlators each corresponding to a particular error sequence $E_k$, and to perform the correlations in parallel in order to increase throughput. FIG. 8A also illustrates the correlator operating in the PR4 domain since in FIG. 7B the channel samples 176 and remodulated samples 140 are in the PR4 domain. However, improved performance may be achieved by correlating the error events in a higher order partial response domain, such as in the EPR4 domain. To implement this embodiment, the sample errors 144 would pass through a filter of the form $(1+D)^n$ to convert the sample errors 144 into the higher order partial response domain. Further, the selected error events E[i] 106 would correspond to the sample errors of the higher order partial response domain. Although this alternative embodiment may provide better performance, it also increases the circuitry since the length of the error events E[i] increases (see FIG. 5A–5D) and thus the length of the correlator 180 increases.

The error pattern detector also comprises a table 182 which stores the values corresponding to equation (8) described above. The values for equation (8) can be pre-computed and stored in a table rather than computed at run-time because the values for E[i] and $hh_k$ are known after calibrating for $hh_k$. In other words, once coefficients $hh_k$ are determined for each zone using the auto-correlation calibration operation of equation (20) described above, the values for equation (8) can be generated and stored in a table (memory) for use by the error pattern detector 122 in implementing equation (9). The output of the correlator 180 is subtracted 184 from the output of table 182 to generate a result 186 for equation (9) corresponding to each error sequence $E_k$. The result 186 of equation (9) is compared 187 to a threshold Th which may be fixed but in the preferred embodiment is programmable. If the result 186 of equation (9) is less than the threshold Th, then the trellis sequence detector 88 is deemed to have made a detection error and the error pattern detector 122 signals the error corrector 124 over line 101 to make the appropriate correction.

In general, as described above with respect to equation (5), an error is detected if the result of equation (9) is negative because it means that the corrected sample sequence is closer in Euclidean distance to the received sample sequence after whitening the noise in the read signal. Therefore, in the general embodiment of the error pattern detector 122 shown in FIG. 8A, the threshold Th is simply zero. As described in greater detail below, however, in the preferred embodiment the threshold Th is programmable in order to implement the iterative correction algorithms of the present invention.

Figure 9:
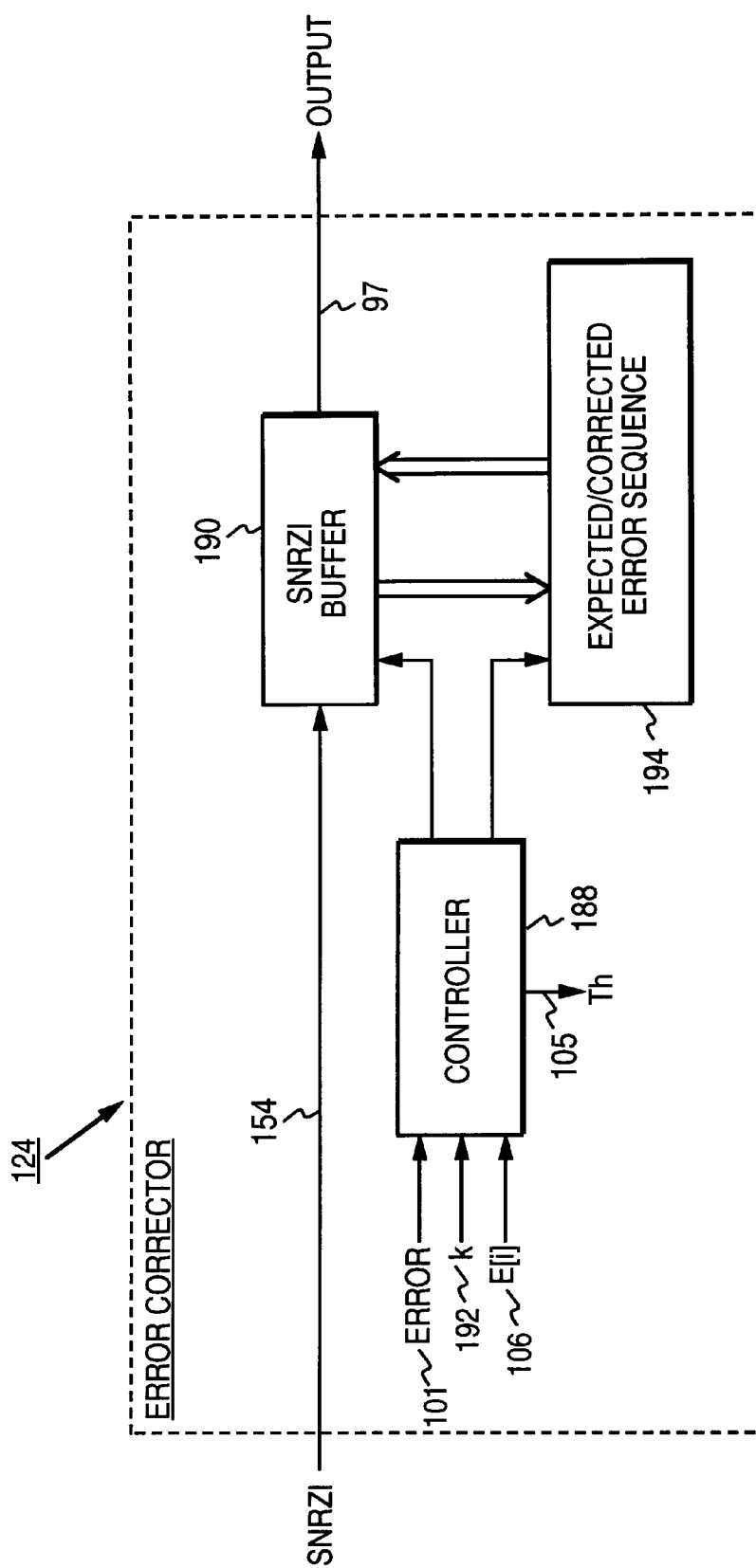
FIG. 9 shows details of the error corrector of the post processor of the present invention.

The post processor 95 shown in FIG. 7A and 7B does not implement the iterative correction algorithms of the present invention; instead, it makes only one pass over the data to detect and correct errors in the preliminary sequence detected by the trellis sequence detector 88. Details of the error corrector 124 for this embodiment of the post processor 95 are shown in FIG. 9. The preliminary sequence (the SNRZI sequence 154 in FIG. 9) detected by the trellis sequence detector 88 is stored in a buffer 190 so that it can be retrieved and corrected when an error is detected.

A controller 188 is shown in FIG. 9 as controlling the correction procedure of the error corrector 124; however, the controller 188 may be implemented as logic circuits dispersed throughout the error pattern detector 122 and error corrector 124. In other words, the controller 188 shown in FIG. 9 is not necessarily a separate element of the invention; it is illustrated only to indicate that some sort of control logic is necessary to facilitate the error detection and correction process of the invention.

The controller 188 uses various signals or states in carrying out the error correction procedure: the ERROR signal 101 from the error pattern detector 122, which indicates when an error event is detected; the index k 192, which is the same index in the error pattern detector 122 and which indicates the location of the detected error event within the preliminary sequence stored in the buffer 190; and the error event sequence E[i] 106 that is associated with the detected error event. When an error event is detected (ERROR signal 101 activated), a comparison is performed to verify that the preliminary sequence stored in the buffer 190 is consistent with the error sequence E[i] 106 associated with the type of error event detected. If the detected error event is not consistent with the detected sequence stored in the buffer 190, then the correction is not made. In FIG. 9, this function is carried out by the circuitry labeled expected/corrected error sequence 194 which performs the comparison as well as makes the correction to the data stored in the buffer 190 if the correction is consistent with the detected error event. Again, the expected/corrected error sequence 194 is not necessarily a separate, self-contained element of the read channel; it merely illustrates that in the preferred embodiment there is logic circuitry within the read channel for carrying out the specific function.

Operation of the expected/corrected error sequence 194 is understood with reference to Table 2 and Table 3 which show the expected SNRZI sequences and the corresponding corrected SNRZI sequences for the most dominant error events of an EPR4 sequence detector (the SNRZI error event (+1,−1), and the SNRZI error event (+1,−2,+2,−1)):

TABLE 2

SNRZI Error (+1, −1)

| Expected SNRZI | | Corrected SNRZI | | Expected SNRZI | | Corrected SNRZI | |
|---|---|---|---|---|---|---|---|
| $S_n$ | $S_{n-1}$ | $S_n$ | $S_{n-1}$ | $S_n$ | $S_{n-1}$ | $S_n$ | $S_{n-1}$ |
| +1 | −1 | +0 | +0 | −1 | +1 | −0 | −0 |
| −0 | −1 | −1 | +0 | +0 | +1 | +1 | −0 |
| +1 | −0 | +0 | +1 | −1 | +0 | −0 | −1 |
| −0 | −0 | −1 | +1 | +0 | +0 | +1 | −1 |

TABLE 3

SNRZI Error (+1, −2, +2, −1)

| Expected SNRZI | | | | Corrected SNRZI | | | | Expected SNRZI | | | | Corrected SNRZI | | | |
|---|---|---|---|---|---|---|---|---|---|---|---|---|---|---|---|
| $S_n$ | $S_{n-1}$ | $S_{n-2}$ | $S_{n-3}$ | $S_n$ | $S_{n-1}$ | $S_{n-2}$ | $S_{n-3}$ | $S_n$ | $S_{n-1}$ | $S_{n-2}$ | $S_{n-3}$ | $S_n$ | $S_{n-1}$ | $S_{n-2}$ | $S_{n-3}$ |
| −0 | −1 | +1 | −0 | −1 | +1 | −1 | +1 | +0 | +1 | −1 | +0 | +1 | −1 | +1 | −1 |
| −0 | −1 | +1 | −1 | −1 | +1 | −1 | +0 | +0 | +1 | −1 | +1 | +1 | −1 | +1 | −0 |
| +1 | −1 | +1 | −0 | +0 | +1 | −1 | +1 | −1 | +1 | −1 | +0 | −0 | −1 | +1 | −1 |
| +1 | −1 | +1 | −1 | +0 | +1 | −1 | +0 | −1 | +1 | −1 | +1 | −0 | −1 | +1 | −0 |

The detected SNRZI sequence stored in the buffer 190 of FIG. 9 are compared to the "Expected SNRZI" sequences in the above lookup tables to determine whether a valid correction can be made. The expected/corrected error sequence 194 may also include circuitry to evaluate the "corrected SNRZI" sequences in the above tables relative to the surrounding datum stored in the buffer 190 to determine whether a correction will violate a particular channel code constraint, such as a run-length-limited (RLL) d=1 constraint. If the channel code constraint would be violated, the correction is deemed invalid and not made.

An additional enhancement to the present invention, as described in the following section, is to employ an error detection channel code to determine when the trellis sequence detector 88 has made a detection error. Thus, in addition to making corrections that decrease the Euclidean distance after noise whitening, the post processor 95 corrects the most likely error(s) associated with the error syndrome of the error detection channel code. This embodiment approaches the performance gain realized by matching the trellis state machine to the error detection channel code, but at a significant reduction in cost and complexity.

Error Detection Channel Code

An optional aspect of the present invention is to employ an error detection channel code to enhance the operation of the post processor 95 in correcting errors made by the trellis sequence detector 88. In this embodiment, the channel encoder 36 of FIG. 3 encodes an error detection channel code into the user data (e.g., parity over a block of bits). During a read operation, an error syndrome is generated from the preliminary sequence output by the trellis sequence detector 88, where the error syndrome indicates when the trellis sequence detector 88 has made a detection error. The post processor 95 responds to the error syndrome by correcting the most likely, valid error event to have caused the detection error.

Those skilled in the art understand that various error detection channel codes could be employed to implement this aspect of the present invention. In the embodiment disclosed herein, the error detection code is implemented as parity over a block of bits in the NRZ or "write current" domain. This can be accomplished using a single channel encoder 36 that encodes other channel code constraints (RLL, QM2, etc.) as well as the error detection channel code constraints, or it can be accomplished by concatenating two channel encoders: a first channel encoder that encodes the other channel code constraints (RLL, QM2, etc.) followed by a second channel encoder that encodes the error detection channel code constraints. The actual implementation of the error detection channel code is designated; however, two examples and details on how to implement a parity error detection code are provided in the above referenced U.S. patent applications: "SAMPLED AMPLITUDE READ CHANNEL EMPLOYING A REMOD/DEMOD SEQUENCE DETECTOR GUIDED BY AN ERROR SYNDROME," and "A SAMPLED AMPLITUDE READ CHANNEL EMPLOYING A TRELLIS SEQUENCE DETECTOR MATCHED TO A CHANNEL CODE CONSTRAINT AND A POST PROCESSOR FOR CORRECTING ERRORS IN THE DETECTED BINARY SEQUENCE USING THE SIGNAL SAMPLES AND AN ERROR SYNDROME."

Figure 10A:
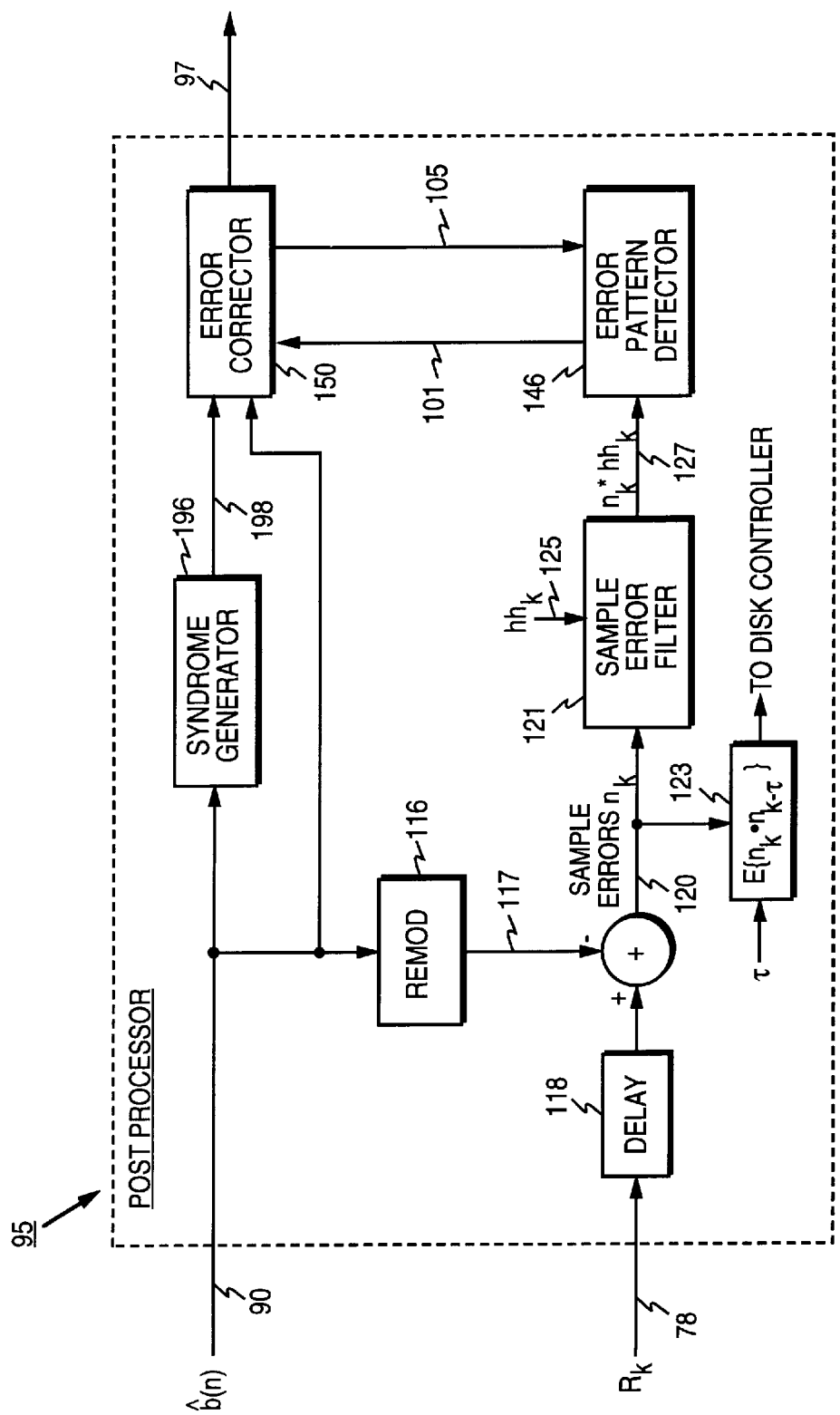
FIG. 10A shows an embodiment of the post processor enhanced by syndrome generator for generating an error syndrome from an error detection code encoded into the user data, wherein the error syndrome indicates when the trellis sequence detector has made a detection error.

A generalized block diagram of the post processor 95 of FIG. 3 that implements the error detection channel code aspect of the present invention is shown in FIG. 10A. The operation and elements are essentially the same as the post processor 95 described above with reference to FIG. 7A, with the addition of a syndrome generator 196 for generating an error syndrome 198 in response to the preliminary sequence 90 output by the trellis sequence detector 88. The error syndrome 198 enhances operation of the error corrector 150 by indicating when the trellis sequence detector 88 has made a detection error. The error corrector 150 responds by correcting the most likely error to have caused the detection error, even if correcting the error will not decrease the Euclidean distance after noise whitening. As described in more detail below, in the preferred embodiment all errors that reduce the Euclidean distance after noise whitening are corrected first, then the most likely error event to have caused an error syndrome error is corrected.

Figure 10B:
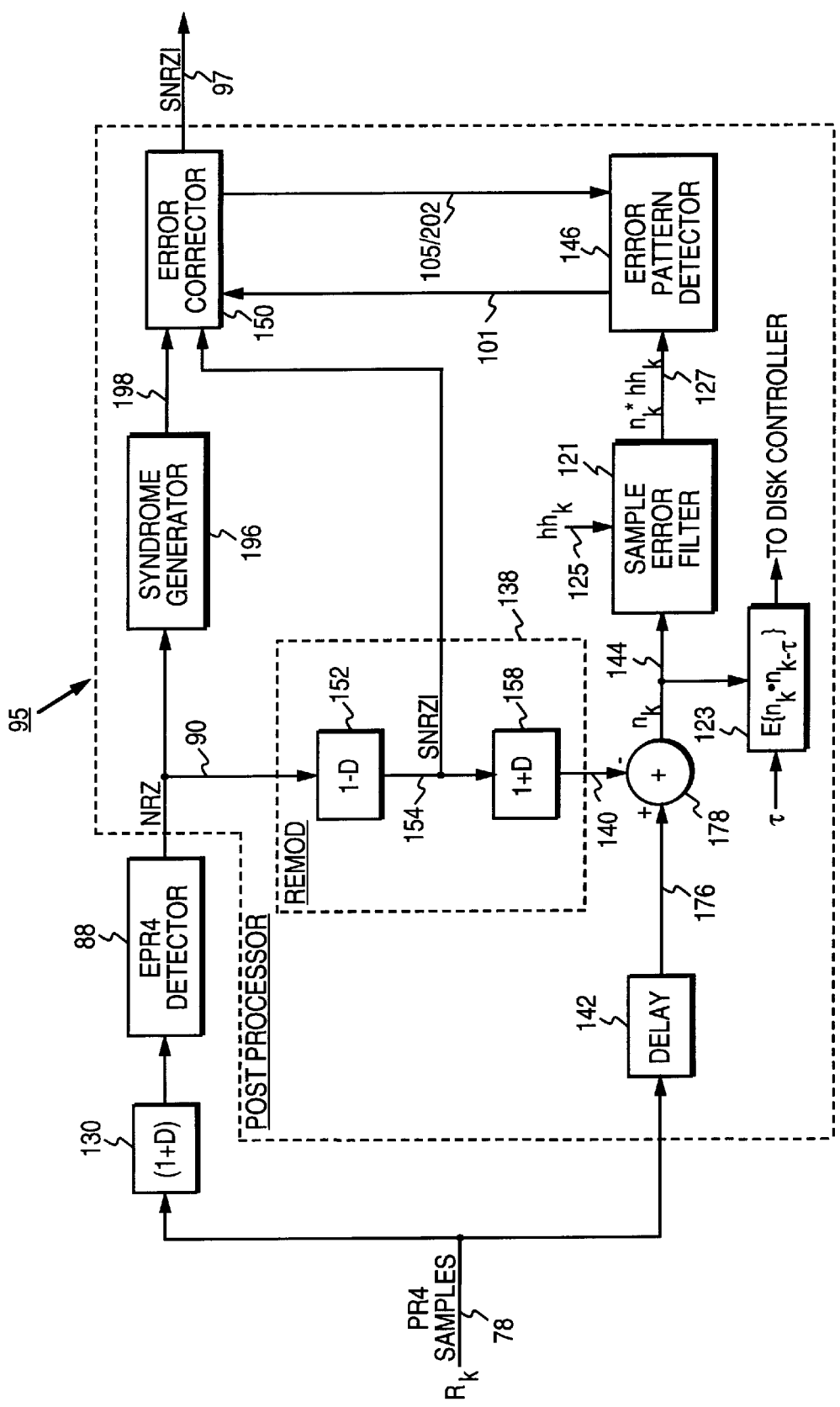
FIG. 10B shows details of the preferred embodiment for the post processor of the present invention that also employs a syndrome generator.

Details of the preferred embodiment for the post processor 95 employing an error syndrome generator 196 are shown in FIG. 10B. The operation and elements are essentially the same as described above with reference to FIG. 7B, with the addition of the syndrome generator 196 for generating a parity error syndrome 198 over a block of the preliminary sequence 90 output by the trellis sequence detector 88. In the preferred embodiment the parity error syndrome 198 is computed in the NRZ or "write current" domain; therefore, the EPR4 trellis sequence detector operates according to the NRZ state machine shown in FIG. 6 so that the preliminary sequence 90 is output in the NRZ domain.

Figure 11:
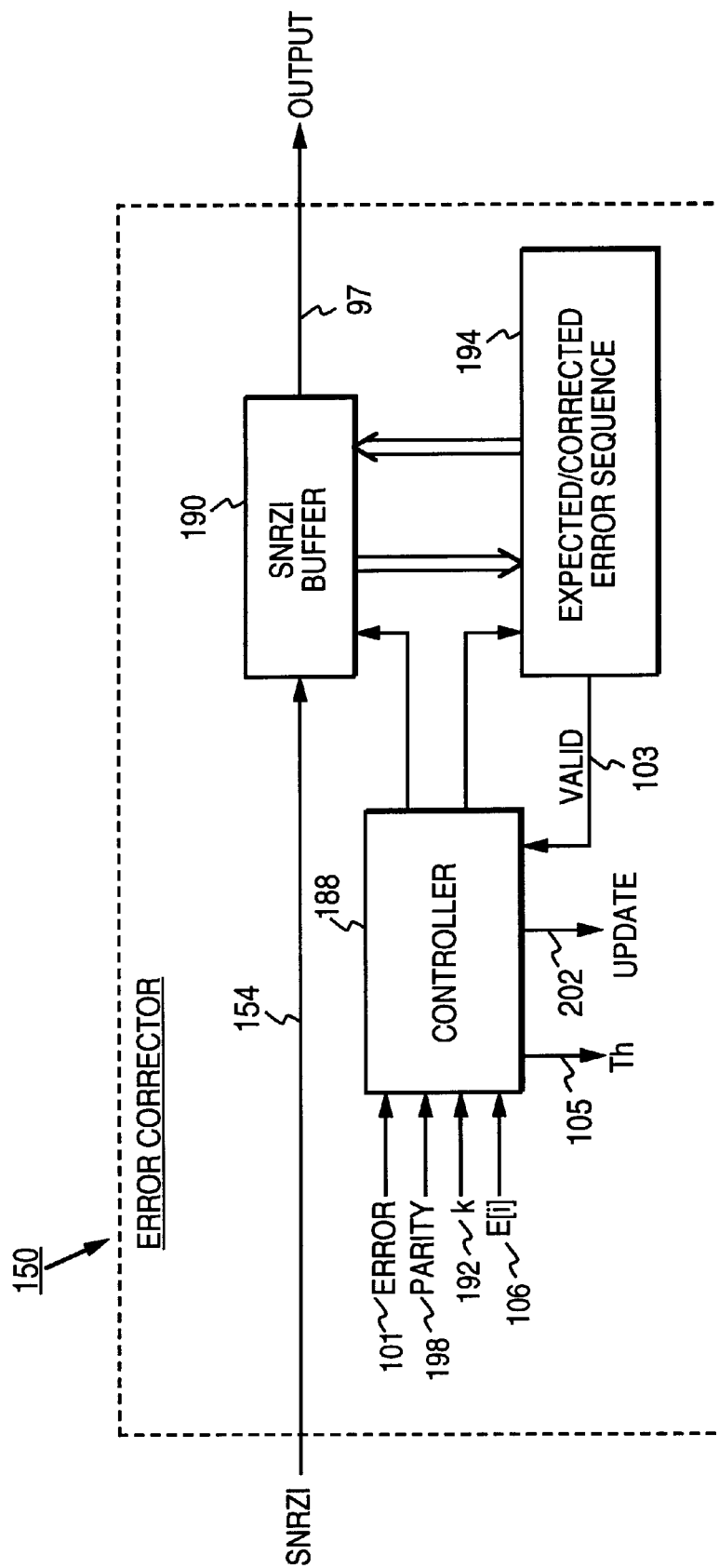
FIG. 11 shows details of the error corrector of the post processor, including a controller responsive to a parity syndrome generated by the syndrome generator of FIG. 10B.

The modification to the error corrector 150 of FIG. 10B when using the error detection channel code aspect of the present invention is shown in FIG. 11. The controller 188 processes the SNRZI data 154 stored in the buffer 190 in blocks of data representing codewords of the error detection code (e.g., in n-bit parity codewords). The controller 188 first corrects all of the errors that will reduce the Euclidean distance after noise whitening as described above with respect to equation (9). During this operation, if a correction is made by the expected/corrected error sequence 194 it signals the controller 188 over line 103 to update the error syndrome (e.g., parity syndrome 198) using the correction sequence. Updating a parity syndrome simply means XOR-ing it with the parity of the correction sequence XORed with the parity of the uncorrected sequence.

After making all the corrections that will reduce the Euclidean distance after noise whitening (i.e., after correcting all errors that will generate a negative result for equation (9)), the controller 188 examines the error syndrome (e.g., parity syndrome 198) to determine whether an error still exists in the preliminary sequence 90 stored in the buffer 190. If the error syndrome indicates an error exists (e.g., the parity syndrome is non-zero), then the controller 188 searches for the error event that is consistent with the error syndrome and that generates the minimum result from equation (9). When using a parity error detection channel code, for example, the controller 188 modifies the error sequences E[i] 106 to include only those error events that will cause a parity error. The controller 188 then scans through the filtered sample errors $n_k*hh_k$ 127 using the error pattern detector 122 of FIG. 8A and saves the error event E[i] 106 and location k 192 that generate the minimum result for equation (9). The error event E[i] 106 and location k 192 are then used to correct the preliminary sequence 90 stored in the buffer 190. This process is described in the following section with reference to the flow diagram shown in FIG. 12B. The following section also describes an additional enhancement to the present invention: buffering the filtered sample errors $n_k*hh_k$ 127 and iterating the correction process in order to detect and correct overlapping error events that cannot otherwise be detected.

Iterative Error Correction

Yet another optional aspect of the present invention that further enhances the performance of the read channel is to iterate the error correction procedure in order to detect and correct overlapping error events that would not otherwise be detected in a first pass over the data. Overlapping error events are those that are close in proximity such that they interfere with one another. If a first error event is "corrupted" by a nearby second error event, then the first error event may be undetectable using equation (9), that is, the first error event being corrupted by the second error event may not generate a negative result for equation (9). However, if the second error event is detectable using equation (9) and therefore corrected, then the first error event can be detected and corrected during a subsequent pass over the data. Similarly, correcting the first error event may render yet another error event detectable and correctable during yet another pass over the data. Thus, an aspect of the present invention is to reiterate the correction process until no corrections are made in the last pass. Further, if the above-described error detection channel code is employed, then the error correction procedure is reiterated until all of the corrections that reduce the Euclidean distance after noise whitening are made, as well as all the corrections that are detected using the error syndrome are made.

In order for the iterative correction procedure to work effectively, it is necessary to update the filtered sample errors $n_k*hh_k$ 127 after a correction is made to the received sample sequence. In effect, the sample errors $n_k$ 144 of FIG. 10B are regenerated using estimated samples 140 that have been corrected relative to the detected error event. The updated sample errors $n_k$ 144 are then re-filtered 121 to generate updated filtered sample errors $n_k*hh_k$ 127 which replace those stored in the buffer. An equivalent operation, however, is to simply subtract the factor $E_k*hh_k$ of equation (7) from the corresponding filtered sample errors $n_k*hh_k$ 127 stored in the buffer. This operation is understood with reference to FIG. 8B which shows details of the error pattern detector 146 of FIG. 10B.

Figure 8B:
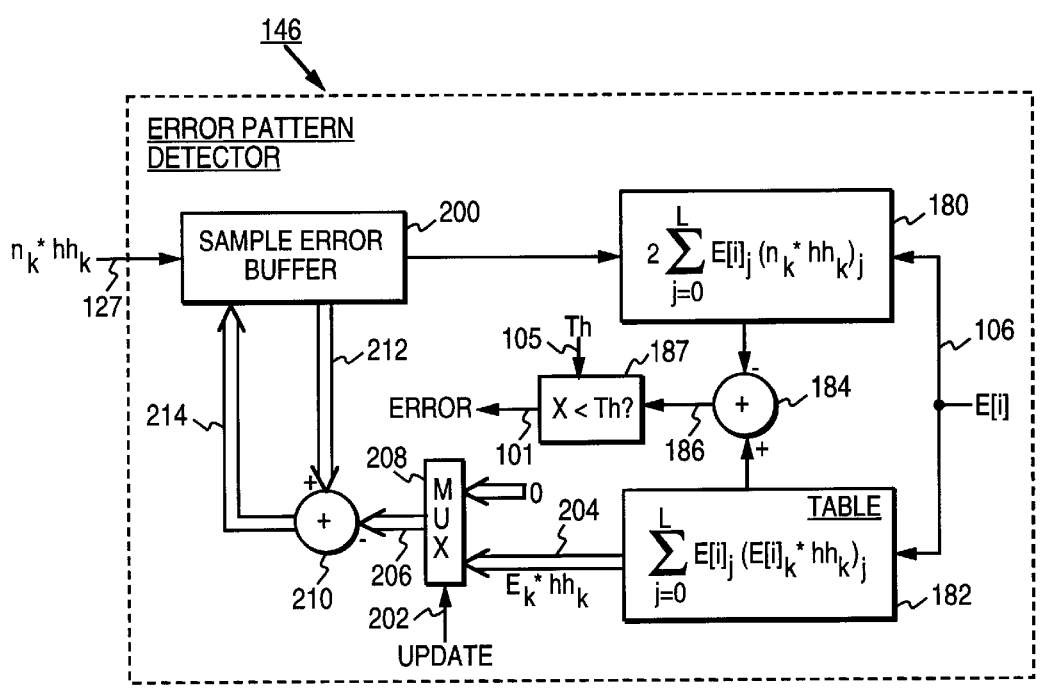
FIG. 8B shows an enhanced embodiment of the error pattern detector employed in the post processor of the present invention.

The operation and elements of FIG. 8B are essentially the same as in FIG. 8A described above, with the addition of a sample error buffer 200 for storing the filtered sample errors $n_k*hh_k$ 127, and the additional circuitry used to update the filtered sample errors $n_k*hh_k$ 127 when a correction is made. When a correction is made, the controller 188 generates an update signal 202 which selects the factor $E_k*hh_k$ 204 of equation (7) from table 182 as the output 206 of multiplexer 208. The factor $E_k*hh_k$ 204 is then subtracted 210 from the corresponding filtered sample errors $n_k*hh_k$ 212 and the result 214 restored to the sample error buffer 200. Thus, in the next iteration the filtered sample errors $n_k*hh_k$ will have been updated according to the corrections made during the previous pass, thereby enabling the detection of overlapping error events during the next pass.

In general, the iterative correction procedure operates by: (1) processing the data and correcting all error events that reduce the Euclidean distance between the received sample sequence and the valid output sequences; (2) updating a Euclidean distance error metric when a correction is made; and (3) iterating steps (1) and (2) until no further errors are detected. If an error detection channel code is employed as described above, then the iterative correction procedure operates by: (1) processing the data and correcting all error events that reduce the Euclidean distance between the received sample sequence and the valid output sequences; (2) updating a Euclidean distance error metric when a correction is made; (3) iterating steps (1) and (2) until no further errors are detected; (4) generating an error syndrome (or generating and then updating an error syndrome using the corrections); (5) if the error syndrome indicates error(s) remain, correcting the error(s) most likely associated with the error syndrome and updating the Euclidean distance error metric; and (6) iterating steps (1) through (5) until no further errors are detected.

Figure 12A:
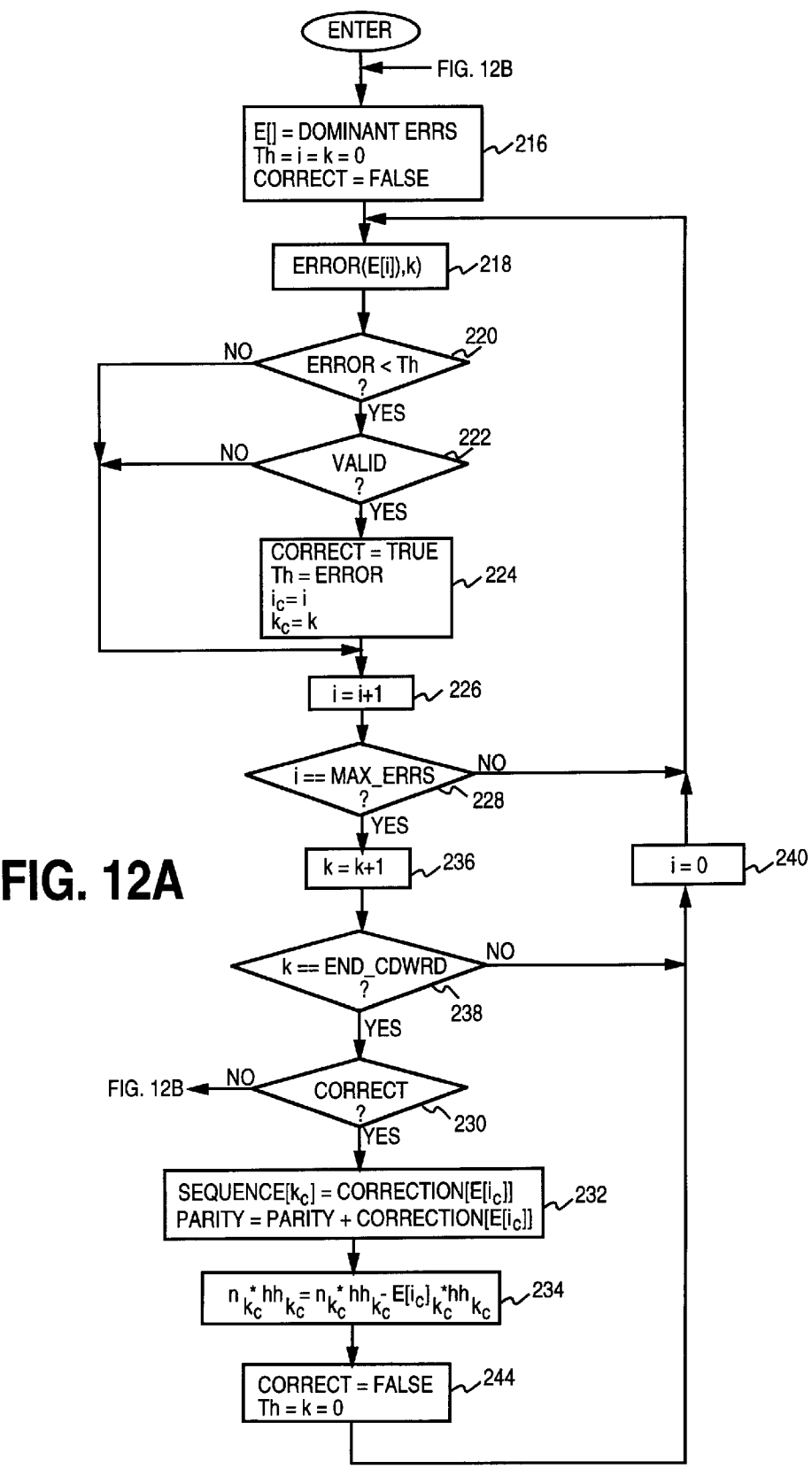
FIGS. 12A–12B are flow diagrams which illustrate an aspect of the present invention wherein the error detection and correction procedure implemented by the post processor is executed iteratively in order to detect and correct overlapping error events.
Figure 12B:
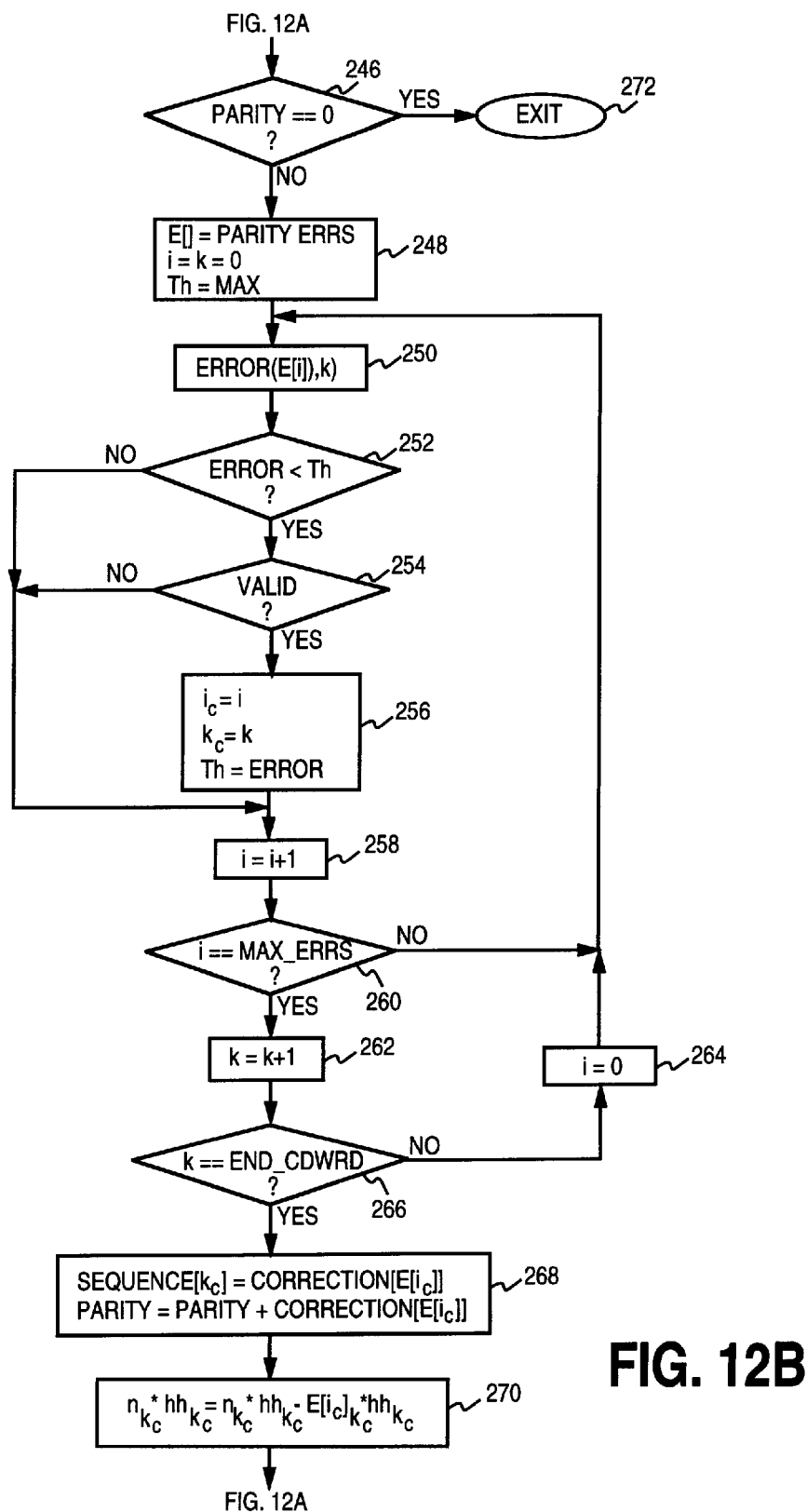

The iterative error correction procedure executed by the controller 188 of FIG. 11 is further understood with reference to the flow diagrams shown in FIGS. 12A and 12B. Referring to FIG. 12A, at step 216 the controller 188 initializes certain variables: the error events E[ ] are initialized with the dominant error events of the trellis sequence detector 88; the threshold Th 105 is initialized to zero and loaded into the comparator 187 of FIG. 8B; the error event index i and the data index k are initialized to zero; and a flag CORRECT, which indicates whether a correction was made during the previous pass, is initialized to FALSE.

At step 218 the error pattern detector 146 of FIG. 8B generates a result ERROR for equation (9) to check whether the error event E[i] occurred at location k within the current codeword. An error is detected if at step 220 the result ERROR of equation (9) is less than the threshold Th (i.e., if ERROR is Less than zero). If an error is detected at step 220, then at step 222 the expected/corrected error sequence circuitry 194 of FIG. 11 is used to verify whether a correction at location k is consistent with the error event detected (e.g., using Table 2 and Table 3 described above). If the correction is valid at step 222, then at step 224 the CORRECT flag is set to TRUE since a correction will be made, the threshold Th is set to ERROR, an index variable $i_c$ is set to the current error event, and an index variable $k_c$ is set to the codeword index k to save the location of the detected error event. The threshold is set to ERROR so that an error will be detected at location k only if another error event generates a more negative result from equation (9). At step 226 the error event index i is incremented and the loop starting with step 218 is re-executed for the next error event. The loop is re-executed until the error event index i equals the maximum number of error events $MAX_{13}$ ERRS at step 228.

At step 236 the data index k is incremented and the loop starting with step 218 is re-executed after resetting the error event index i to zero at step 240. This loop is re-iterated until the data index k reaches the end of the codeword (the parity codeword) at step 238. If at step 230 the CORRECT flag is true, then there is an error event detected at location $k_c$ within the codeword. Thus, at step 232 the data sequence stored in the data buffer 190 of FIG. 11 is corrected at location $k_c$ using the correction sequence for the error event $E[i_c]$ detected at step 224. Also at step 232 the parity error syndrome is updated using the correction sequence for the error event $E[i_c]$. At step 234, the filtered sample errors $n_{k_c}*hh_{k_c}$ stored in the buffer 200 of FIG. 8B are updated by subtracting the factor $E_{k_c}*hh_{k_c}$ of equation (7) from the corresponding filtered sample errors $n_{k_c}*hh_{k_c}$ at location $k_c$. At step 244 the CORRECT flag is reset to FALSE and the threshold and the data index k are reset to zero. The entire error detection and correction procedure of FIG. 12A is then re-executed for the current codeword to correct any remaining errors, particularly overlapping errors that were not detected in the previous pass. The error detection and correction procedure of FIG. 12A is re-iterated until no corrections are made after completing a final pass over the codeword (i.e., until CORRECT is FALSE at step 230).

Eventhough no errors are detected after the final pass over the codeword, the codeword may still contain a detection error. If so, it generally means that the error was a "true" maximum likelihood detection error caused by noise in the read signal rather than by the noise correlating effect of the channel equalizers. In other words, even if the noise in the read signal were whitened perfectly, the sequence detector 88 would still make a detection error because the received signal samples are closer in Euclidean space to an incorrect sample sequence. This is where the error detection channel code of the present invention provides an additional performance enhancing improvement over a conventional sequence detector 88. The error syndrome generated from the channel code indicates when white noise has caused a detection error in the codeword that was not detected by the correction procedure of FIG. 12A. When this happens, the present invention searches through the codeword for the location where the error most likely occurred, and then makes the appropriate correction. The most likely location for the error is the location where equation (9) is minimum (but greater than zero), and where the error event is consistent with received sample sequence, and where the correction is consistent with the error syndrome.

The error detection and correction procedure in the embodiment of the present invention that employs an error detection channel code is further understood with reference to the flow diagram of FIG. 12B. At step 246 of FIG. 12B, the error syndrome (PARITY) is evaluated to determine if a detection error is still present in the codeword. If so, then at step 248 the error events E[ ] are initialized to the dominant error events that correspond to the error syndrome (as opposed to all of the dominant error events at step 216 of FIG. 12A). For example, if the error syndrome is PARITY, then the error events E[ ] are initialized with the dominant error events that could cause a parity error in the codeword. Also at step 248, the error event index i and data index k are initialized to zero, and the threshold Th is initialized to a maximum value. The threshold Th is set to a maximum value at step 248 to ensure that an error event will be detected.

At step 250 the error pattern detector 146 of FIG. 8B generates a result ERROR for equation (9) to check whether the error event E[i] occurred at location k within the current codeword. An error is detected if at step 252 the result ERROR of equation (9) is less than the current threshold Th. If an error is detected at step 252, then at step 254 the expected/corrected error sequence circuitry 194 of FIG. 11 is used to verify whether a correction at location k is consistent with the error event detected. If the correction is valid at step 254, an index variable $i_c$ is set to the current error event, the current location k is saved by assigning it to $k_c$, and the threshold Th is set to ERROR. The threshold is set to ERROR so that an error will be detected subsequently only if another error event generates a smaller result from equation (9). At step 258 the error event index i is incremented and the loop starting with step 250 is re-executed for the next error event. The loop is re-executed until the error event index i equals the maximum number of error events MAX_ERRS at step 260.

At step 262 the data index k is incremented and the loop starting with step 250 is re-executed after resetting the error event index i to zero at step 264. This loop is re-iterated until the data index k reaches the end of the codeword (the parity codeword) at step 266. At step 268 the data sequence stored in the data buffer 190 of FIG. 11 is corrected at location $k_c$ using the correction sequence for the error event $E[i_c]$ detected at step 256. Also at step 268 the parity error syndrome is updated using the correction sequence for the error event $E[i_c]$. At step 270, the filtered sample errors $n_{k_c}*hh_{k_c}$ stored in the buffer 200 of FIG. 8B are updated by subtracting the factor $E_{k_c}*hh_{k_c}$ of equation (7) from the corresponding filtered sample errors $n_{k_c}*hh_{k_c}$ at location $k_c$.

After executing the correction procedure of FIG. 12B, the error correction procedure of FIG. 12A is re-executed to correct any overlapping error events that may have become detectable due to correcting the codeword using the error syndrome. If any further corrections are made, at step 232 the error syndrome (e.g., PARITY) is updated to reflect the correction. The flow diagram of FIG. 12B is then re-executed and the error syndrome evaluated at step 246 to determine if errors still remain in the codeword. If so, the correction procedure of FIG. 12B is re-executed and so on until at step 246 the error syndrome indicates the codeword is error free. The error correction procedure for the current codeword then terminates at step 272, and the corrected codeword is transferred over line 97 from the buffer 190 of FIG. 11 to the channel decoder 92 of FIG. 3. The controller 188 of FIG. 11 then begins executing the correction procedures of FIG. 12A and 12B for the next codeword stored in the buffer 190.

Boundary Conditions

For optimum performance, it is desirable to detect and correct errors that occur at the boundary of a codeword, that is, error events that are present in a current codedword and extend into a previous or following codeword. This is easily accounted for in the present invention by processing the data in an overlapping manner such that a predetermined number of samples preceding and following the current codeword are processed by the post processor 95. Consider, for example, the SNRZI error event (+1,−2,+2,−1) describe above. This error event affects three bits in the NRZ domain such that it may extend over the boundary of a parity codeword. If this error event is detected in the PR4 domain (and thus five samples long), then the error pattern detector 122 would processes a number of sample errors 127 corresponding to the five samples that overlap at the codeword boundaries. For example, when detecting error events of a current parity codeword, the post processor 95 would evaluate the two sample errors at the end of the preceding codeword as well as the three sample errors at the beginning of the following codeword.

Conclusion

The present invention provides performance enhancing improvements over conventional sampled amplitude read channels for disk storage systems. By effectively whitening the noise in the read signal, the present invention enhances the performance of a post processor 95 which detects and corrects the most likely errors made by the trellis sequence detector 88. In addition, the present invention provides an error detection channel code which enhances the performance of a trellis sequence detector 88 by detecting and correcting errors caused by white noise. In other words, the present invention approximates a "true" maximum likelihood sequence detector by effectively correcting errors in whitened noise, and then the present invention provides the additional enhancement of correcting errors that a maximum likelihood sequence detector would make in the presence of white noise using an error detection channel code. Thus, the present invention approximates the performance of a true maximum likelihood sequence detector comprising a state machine matched to the channel code constraint, but with a significant reduction in cost and complexity.

Still further, the present invention employs an iterative error correction procedure for correcting overlapping errors that may not otherwise be detectable. In addition, the iterative error correction procedure may be enhanced through the use of the error detection channel code; the correction procedure may be re-iterated after correcting the most likely error event associated with the channel code error syndrome. This re-iterative aspect of the present invention provides an even closer approximation to a true maximum likelihood sequence detector comprising a state machine matched to the channel code constraint, but with a significant reduction in cost and complexity.

The objects of the invention have been fully realized through the embodiments disclosed herein. Those skilled in the art will appreciate that the various aspects of the invention can be achieved through different embodiments without departing from the essential function. For example, a sample error filter 121 other than the particular filter disclosed herein could be employed to provide essentially the same result. In other words, merely manipulating the above mathematics to achieve a different implementation will not avoid the intended scope of the present invention. Further, error detection channel codes other than parity could be employed to enhance the performance of the post processor 95. Still further, the above-described aspects of the present invention operate essentially independent of one another. For example, one skilled in the art could employ only the noise whitening aspect of the present invention without using the error detection channel code or the iterative error correction procedures described above. These aspects are being claimed independently in separate applications; they do not necessarily interact to limit the scope of the present invention as appropriately construed from the following claims.

I claim:

1. A sampled amplitude read channel for reading data recorded on a disk storage medium by detecting an estimated data sequence from a sequence of discrete-time sample values generated by sampling an analog read signal emanating from a read head positioned over the disk storage medium, the sampled amplitude read channel comprising:

(a) a sampling device for sampling the analog read signal to generate the discrete-time sample values;

(b) a discrete-time equalizer for equalizing the discrete-time sample values according to a desired partial response to generate a sequence of equalized sample values;

(c) a discrete-time sequence detector for detecting a preliminary sequence from the equalized sample values; and (d) a post processor for detecting and correcting errors in the preliminary sequence comprising:

(i) a remodulator for remodulating the preliminary sequence into a sequence of estimated sample values;

(ii) a sample error generator, responsive to the equalized sample values and the estimated sample values for generating a sequence of sample errors;

(iii) a sample error filter for filtering the sample errors to generate filtered sample errors;

(iv) an error detector, responsive to the filtered sample errors, for detecting errors in the preliminary sequence; and (v) an error corrector, responsive to the error detector, for correcting errors detected in the preliminary sequence, wherein the filtered sample errors are modified to reflect a correction made to the preliminary sequence.

2. A sampled amplitude read channel for reading data recorded on a disk storage medium by detecting an estimated data sequence from a sequence of discrete-time sample values generated by sampling an analog read signal emanating from a read head positioned over the disk storage medium, the sample amplitude read channel comprising:

(a) a sampling device for sampling the analog read signal generate the discrete-time sample values;

(b) a discrete-time equalizer for equalizing the discrete-time sample values according to a desired partial response to generate a sequence of equalized sample values;

(c) a discrete-time sequence detector for detecting a preliminary sequence from the equalized sample values; and (d) a post processor for detecting and correcting errors in the preliminary sequence comprising:

(i) a remodulator for remodulating the preliminary sequence into a sequence of estimated sample values;

(ii) a sample error generator, responsive to the equalized sample values and the estimated sample values for generating a sequence of sample errors;

(iii) a sample error filter comprising a plurality of coefficients for filtering the sample errors to generate filtered sample errors, wherein the sample error filter comprises coefficients which approximate:

$$h_k * h_{-k}$$

where $h_k$ represents an impulse response of a noise whitening filter;

(iv) an error detector, responsive to the filtered sample errors, for detecting errors in the preliminary sequence; and (v) an error corrector, responsive to the error detector, for correcting errors detected in the preliminary sequence.

3. The sampled amplitude read channel as recited in claim 2, wherein the error detector comprises a correlator for correlating an error sequence corresponding to an error event of the sequence detector with the filtered sample errors to generate a correlated error value.

4. The sampled amplitude read channel as recited in claim 3, wherein:

(a) the error detector further comprises a memory for storing a constant corresponding to the error sequence; and (b) the error detector computes an error metric from the correlated error value and the constant stored in memory.

5. The sampled amplitude read channel as recited in claim 4, wherein:

(a) the error detector further comprises a comparator for comparing the error metric to a threshold; and (b) the error corrector corrects an error in the preliminary sequence when the error metric exceeds the predetermined threshold.

6. The sampled amplitude read channel as recited in claim 5, wherein the error detector modifies the filtered sample errors to reflect a correction made to the preliminary sequence.

7. The sampled amplitude read channel as recited in claim 6, wherein the error detector modifies the filtered sample errors by subtracting a constant corresponding to the error sequence from corresponding filtered sample errors.

8. The sampled amplitude read channel as recited in claim 2, further comprising a calibration circuit for calibrating the coefficients of the sample error filter.

9. The sampled amplitude read channel as recited in claim 8, wherein the calibration circuit comprises an auto-correlator for computing an auto-correlation of the sample errors.

10. The sampled amplitude read channel as recited in claim 2, wherein:

(a) the disk storage system comprises a plurality of recording zones;

(b) the post processor further comprises a memory for storing a plurality of coefficients corresponding to a first and second recording zones; and (c) the post processor initializes the coefficients of the sample error filter with the coefficients stored in the memory when the read head passes from the first zone into the second zone.

11. The sampled amplitude read channel as recited in claim 2, wherein the post processor further comprises a syndrome generator for generating an error syndrome from the preliminary sequence, wherein the preliminary sequence is corrected by the error corrector when the error syndrome indicates the presence of an error.

12. The sampled amplitude read channel as recited in claim 11, wherein the error syndrome is generated as parity over a predetermined number of datum in the preliminary sequence.

13. A sampled amplitude read channel for reading data recorded on a disk storage medium by detecting an estimated data sequence from a sequence of discrete-time sample values generated by sampling an analog read signal emanating from a read head positioned over the disk storage medium, the sampled amplitude read channel comprising:

(a) a sampling device for sampling the analog read signal to generate the discrete-time sample values;

(b) a discrete-time equalizer for equalizing the discrete-time sample values according to a desired partial response to generate a sequence of equalized sample values;

(c) a discrete-time sequence detector for detecting a preliminary sequence from the equalized sample values; and (d) a post processor for detecting and correcting errors in the preliminary sequence comprising:

(i) a remodulator for remodulating the preliminary sequence into a sequence of estimated sample values;

(ii) a sample error generator, responsive to the equalized sample values and the estimated sample values for generating a sequence of sample errors;

(iii) a sample error filter comprising more than three coefficients for filtering the sample errors to generate filtered sample errors;

(iv) a calibration circuit for calibrating the coefficients of the sample error filter;

(v) an error detector, responsive to the filtered sample errors, for detecting errors in the preliminary sequence; and (vi) an error corrector, responsive to the error detector, for correcting errors detected in the preliminary sequence.

14. The sampled amplitude read channel as recited in claim 13, wherein the error detector comprises a correlator for correlating an error sequence corresponding to an error event of the sequence detector with the filtered sample errors to generate a correlated error value.

15. The sampled amplitude read channel as recited in claim 14, wherein:

(a) the error detector further comprises a memory for storing a constant corresponding to the error sequence; and (b) the error detector computes an error metric from the correlated error value and the constant stored in memory.

16. The sampled amplitude read channel as recited in claim 15, wherein:

(a) the error detector further comprises a comparator for comparing the error metric to a threshold; and (b) the error corrector corrects an error in the preliminary sequence when the error metric exceeds the predetermined threshold.

17. The sampled amplitude read channel as recited in claim 16, wherein the error detector modifies the filtered samples errors to reflect a correction made to the preliminary sequence.

18. The sampled amplitude read channel as recited in claim 17, wherein the error detector modifies the filtered sample errors by subtracting a constant corresponding to the error sequence from corresponding filtered sample errors.

19. The sampled amplitude read channel as recited in claim 13, wherein the calibration circuit comprises an auto-correlator for computing an auto-correlation of the sample errors.

20. The sampled amplitude read channel as recited in claim 13, wherein the sample error filter comprises coefficients which approximate:

$$h_k * h_{-k}$$

where $h_k$ represents an impulse response of a noise whitening filter.

21. The sampled amplitude read channel as recited in claim 13, wherein:

(a) the disk storage system comprises a plurality of recording zones;

(b) the post processor further comprises a memory for storing a plurality of coefficients corresponding to a first and second recording zones; and (c) the post processor initializes the coefficients of the sample error filter with the coefficients stored in the memory when the read head passes from the first zone into the second zone.

* * * * *